United States Patent
Inoue

(10) Patent No.: US 9,291,804 B2
(45) Date of Patent: Mar. 22, 2016

(54) ZOOM LENS AND IMAGE PICKUP APPARATUS HAVING THE SAME

(71) Applicant: CANON KABUSHIKI KAISHA, Tokyo (JP)

(72) Inventor: Suguru Inoue, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 13/958,170

(22) Filed: Aug. 2, 2013

(65) Prior Publication Data
US 2014/0036137 A1 Feb. 6, 2014

(30) Foreign Application Priority Data
Aug. 6, 2012 (JP) .................................. 2012-174066

(51) Int. Cl.
| G02B 27/64 | (2006.01) |
| G02B 15/14 | (2006.01) |
| G02B 15/15 | (2006.01) |
| G02B 15/22 | (2006.01) |
| G02B 15/177 | (2006.01) |

(52) U.S. Cl.
CPC .............. *G02B 15/15* (2013.01); *G02B 15/177* (2013.01); *G02B 15/22* (2013.01); *G02B 27/646* (2013.01)

(58) Field of Classification Search
CPC ........ G02B 15/00; G02B 15/14; G02B 15/15; G02B 15/16; G02B 15/177; G02B 15/20; G02B 15/22; G02B 27/64; G02B 27/646
USPC .................... 359/554–557, 676–688
See application file for complete search history.

(56) References Cited

U.S. PATENT DOCUMENTS

| 5,557,470 | A | * | 9/1996 | Shibayama .................... 359/687 |
| 5,748,384 | A | * | 5/1998 | Sensui .......................... 359/686 |
| 5,774,267 | A | * | 6/1998 | Kodama et al. ............... 359/557 |
| 6,285,509 | B1 | * | 9/2001 | Nakayama et al. ........... 359/676 |
| 7,382,550 | B2 | | 6/2008 | Nishimura | |
| 8,189,074 | B2 | | 5/2012 | Miyazaki et al. | |
| 2005/0157404 | A1 | | 7/2005 | Kim et al. | |
| 2008/0192360 | A1 | * | 8/2008 | Chang .......................... 359/676 |
| 2009/0002846 | A1 | * | 1/2009 | Souma .......................... 359/695 |
| 2009/0225444 | A1 | * | 9/2009 | Yamamoto ..................... 359/761 |
| 2009/0303611 | A1 | | 12/2009 | Fujisaki et al. | |
| 2010/0172030 | A1 | * | 7/2010 | Yamano ........................ 359/686 |
| 2012/0162778 | A1 | * | 6/2012 | Imaoka .......................... 359/684 |
| 2014/0022442 | A1 | * | 1/2014 | Nishimura ..................... 348/349 |

FOREIGN PATENT DOCUMENTS

| CN | 101726842 A | 6/2010 |
| CN | 201732203 U | 2/2011 |

(Continued)

*Primary Examiner* — Thong Nguyen
(74) *Attorney, Agent, or Firm* — Canon USA Inc. IP Division

(57) ABSTRACT

A zoom lens includes, in order from an object side to an image side, first to third lens units having negative, positive, and negative refractive power, respectively, and a rear lens group including a plurality of lens units and having overall positive refractive power, a distance between every adjacent lens unit included in the zoom lens is variable during zooming. The second lens unit moves in a direction nonparallel to an optical axis during image shake correction, the third lens unit moves in an optical axis direction during focusing, each of the second and third lens units consists of a single lens element, and a focal length of the entire zoom lens at a wide-angle end, a focal length of the second lens unit, and a focal length of the third lens unit are appropriately set.

15 Claims, 19 Drawing Sheets

(56) References Cited

FOREIGN PATENT DOCUMENTS

| CN | 102331619 A | 1/2012 |
|---|---|---|
| CN | 102338927 A | 2/2012 |
| JP | 2004-093647 A | 3/2004 |
| JP | 2011-133739 A | 7/2011 |

* cited by examiner

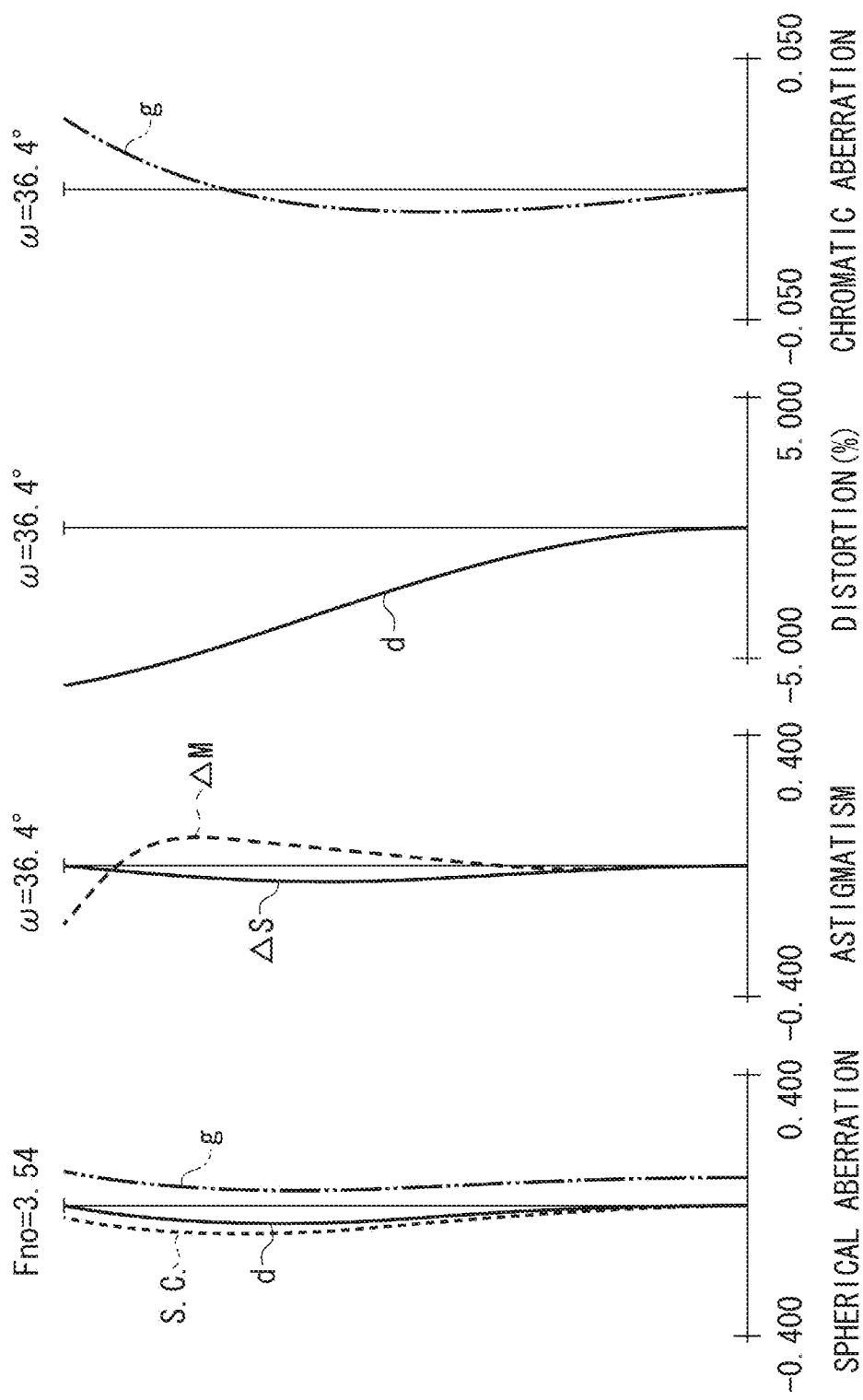

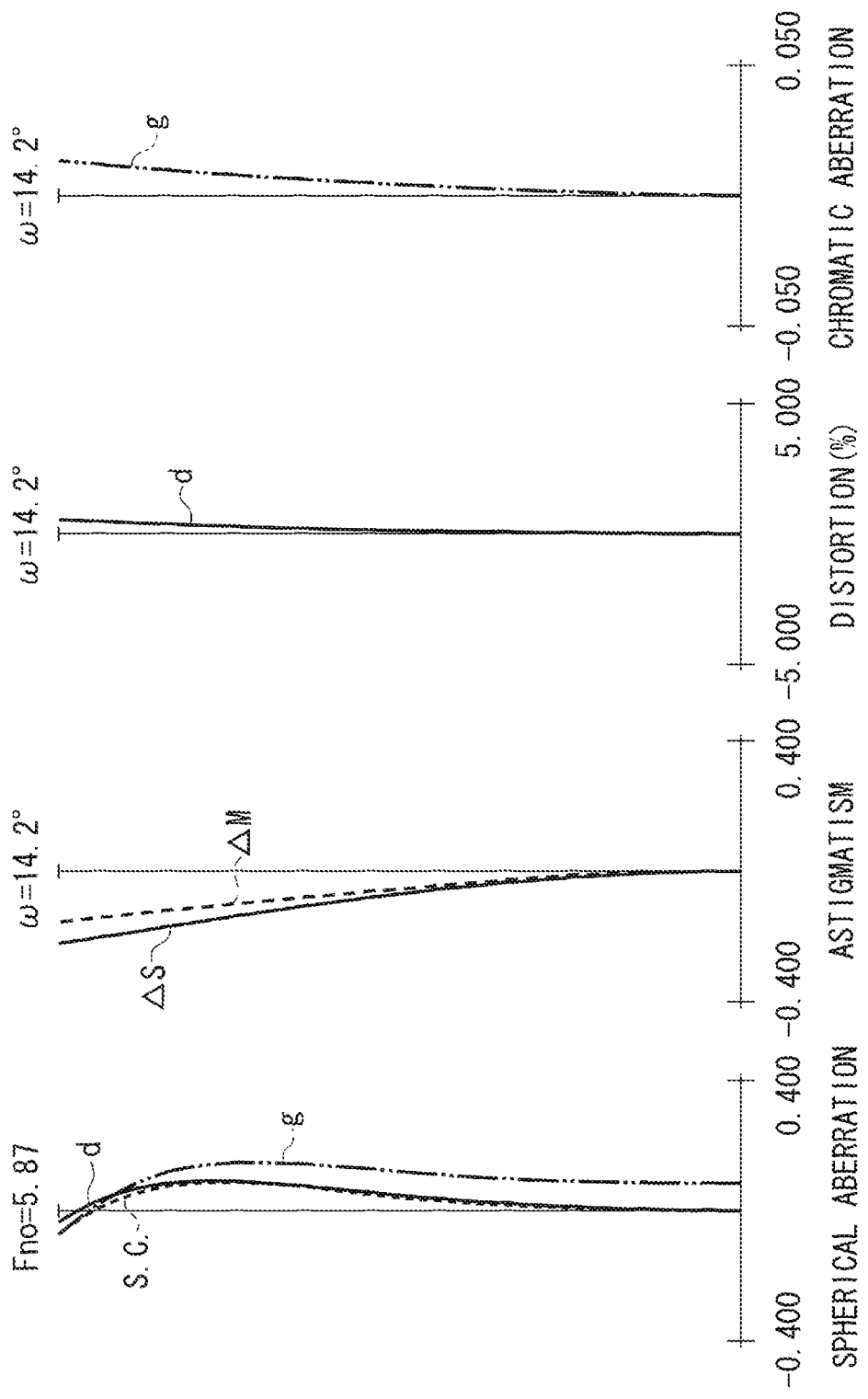

ZOOM LENS AND IMAGE PICKUP APPARATUS HAVING THE SAME

BACKGROUND OF THE INVENTION

1. Field of the Invention

The present invention relates to a zoom lens and an image pickup apparatus having the zoom lens, and is suitable to an image pickup apparatus such as a digital still camera, a video camera, and a silver-halide film camera.

2. Description of the Related Art

Since single-lens reflex cameras of recent years have a moving image photographing function, these cameras are required to have improved focus tracking performance for a moving image being recorded for video and to suppress noise such as a motor sound made by driving lenses.

For example, the contrast-detect automatic focus which determines the in-focus state based on the contrast of the image being recorded executes a wobbling operation for slightly moving a focus lens unit of a photographic optical system forward and backward to determine the peak of the contrast. To shorten the time required to execute the wobbling operation of the focus lens unit and to reduce the motor sound associated with the wobbling operation, it is important to make the focus lens unit more compact and lighter.

On the other hand, the photographic optical system with an image shake correction function is required to be highly responsive to an image shake and to suppress noise such as a motor sound made by driving lenses. Therefore, it is also important to make an image stabilization lens unit of the photographic optical system more compact and lighter.

U.S. Pat. No. 7,382,550 discusses a zoom lens which includes, in order from an object side to an image side, a first lens unit having negative refractive power, a second lens unit having positive refractive power, a third lens unit having negative refractive power, and a fourth lens unit having positive refractive power. This zoom lens realizes a more compact and lighter image stabilization lens unit by employing a single lens of the second lens unit as the image stabilization lens unit. However, since the zoom lens employs a first lens unit including a plurality of lenses of large lens diameters as the focus lens unit, the zoom lens still has an insufficiently compact and light focus lens unit.

U.S. Pat. No. 8,189,074 discusses a zoom lens which includes, in order from an object side to an image side, a first lens unit having negative refractive power, a second lens unit having positive refractive power, a third lens unit having positive refractive power, a fourth lens unit having negative refractive power, and a fifth lens unit having positive refractive power. This zoom lens realizes more compact and lighter focus lens unit and image stabilization lens unit by employing the second lens unit and the fourth lens unit, both of which have relatively small lens diameters and light weights, as the focus lens unit and the image stabilization lens unit, respectively. An aperture stop is arranged at an object side of the fourth lens unit, which is the image stabilization lens unit, and the aperture stop, which tends to be larger because of its drive unit, and the image stabilization lens unit are arranged side by side at the image side of the zoom lens. Therefore, the zoom lens tends to be larger to reserve a space for these components. Particularly in an interchangeable lens for a single-lens reflex camera, amount for detaching, a mirror in the camera, and the like are arranged at the image side, and therefore, it is difficult to reserve a space for arranging the image stabilization lens unit and the aperture stop.

Generally, the focus lens unit and the image stabilization lens unit may each include a lens unit having a less number of lenses to be more compact and lighter. However, when the numbers of lenses constituting the focus lens unit and the image stabilization lens unit are simply reduced, aberrations remaining in the focus lens unit and the image stabilization lens unit increase and, as a result, aberration variation due to the focus and the image stabilization increases. Therefore, it is important to appropriately set the refractive powers of the focus lens unit and the image stabilization lens unit as well as the arrangement of these units in the entire zoom lens to make the focus lens unit and the image stabilization lens unit more compact and lighter while improving their optical performance.

SUMMARY OF THE INVENTION

The present invention is directed to a compact zoom lens having compact and light focus lens unit and image stabilization lens unit with satisfactory optical performance.

According to an aspect of the present invention, a zoom lens includes, in order from an object side to an image side, a first lens unit having negative refractive power, a second lens unit having positive refractive power, and a third lens unit having negative refractive power, and a rear lens group including a plurality of lens units and having overall positive refractive power, a distance between every adjacent lens unit among all lens units in the entire zoom lens being variable during zooming. The second lens unit moves in a direction nonparallel to an optical axis during image shake correction, the third lens unit moves in an optical axis direction during focusing, each of the second lens unit and the third lens unit consists of a single lens element, and, when a focal length of the entire zoom lens at a wide-angle end is denoted by fw, a focal length of the second lens unit is denoted by f2, and a focal length of the third lens unit is denoted by f3, the following conditions are satisfied:

$$2.8 < f2/fw < 4.4$$

$$1.8 < |f3|/fw < 4.5.$$

Further features of the present invention will become apparent from the following description of exemplary embodiments with reference to the attached drawings.

BRIEF DESCRIPTION OF THE DRAWINGS

FIGS. 6A and 6B are aberration diagrams at the wide-angle end and a telephoto end of the zoom lens according to the third exemplary embodiment of the present invention, respectively.

DESCRIPTION OF THE EMBODIMENTS

Various exemplary embodiments, features, and aspects of the invention will be described in detail below with reference to the drawings.

Figure 1:
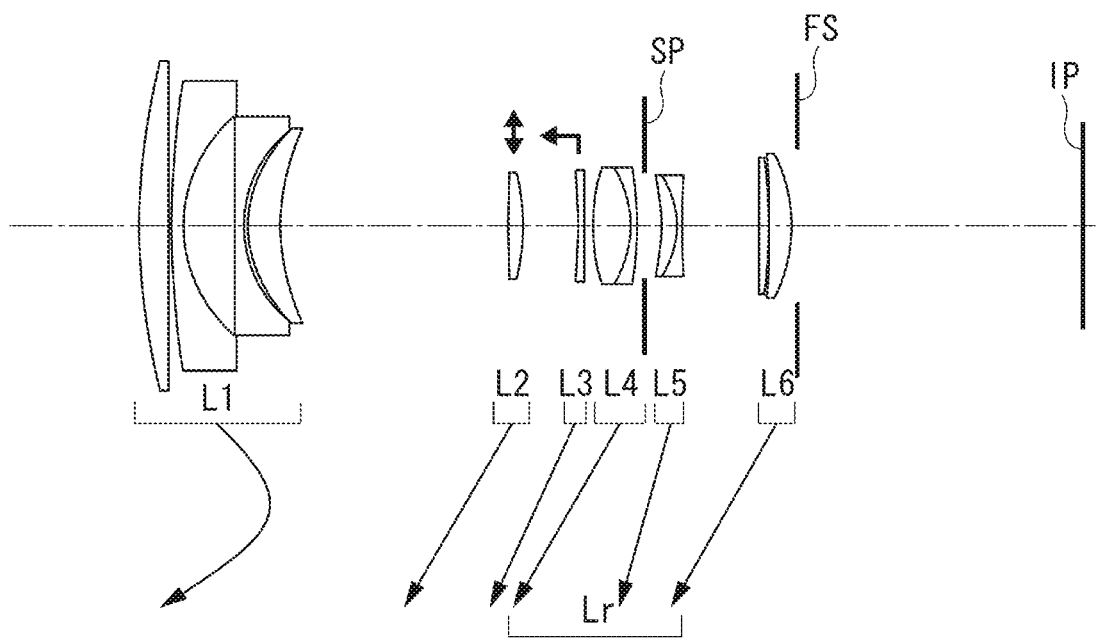
FIG. 1 is a lens cross-sectional view at a wide-angle end of a zoom lens according to a first exemplary embodiment of the present invention.

FIG. 1 is a lens cross-sectional view at a wide-angle end (short focal length end) of a zoom lens according to a first exemplary embodiment of the present invention.

Figure 2A:
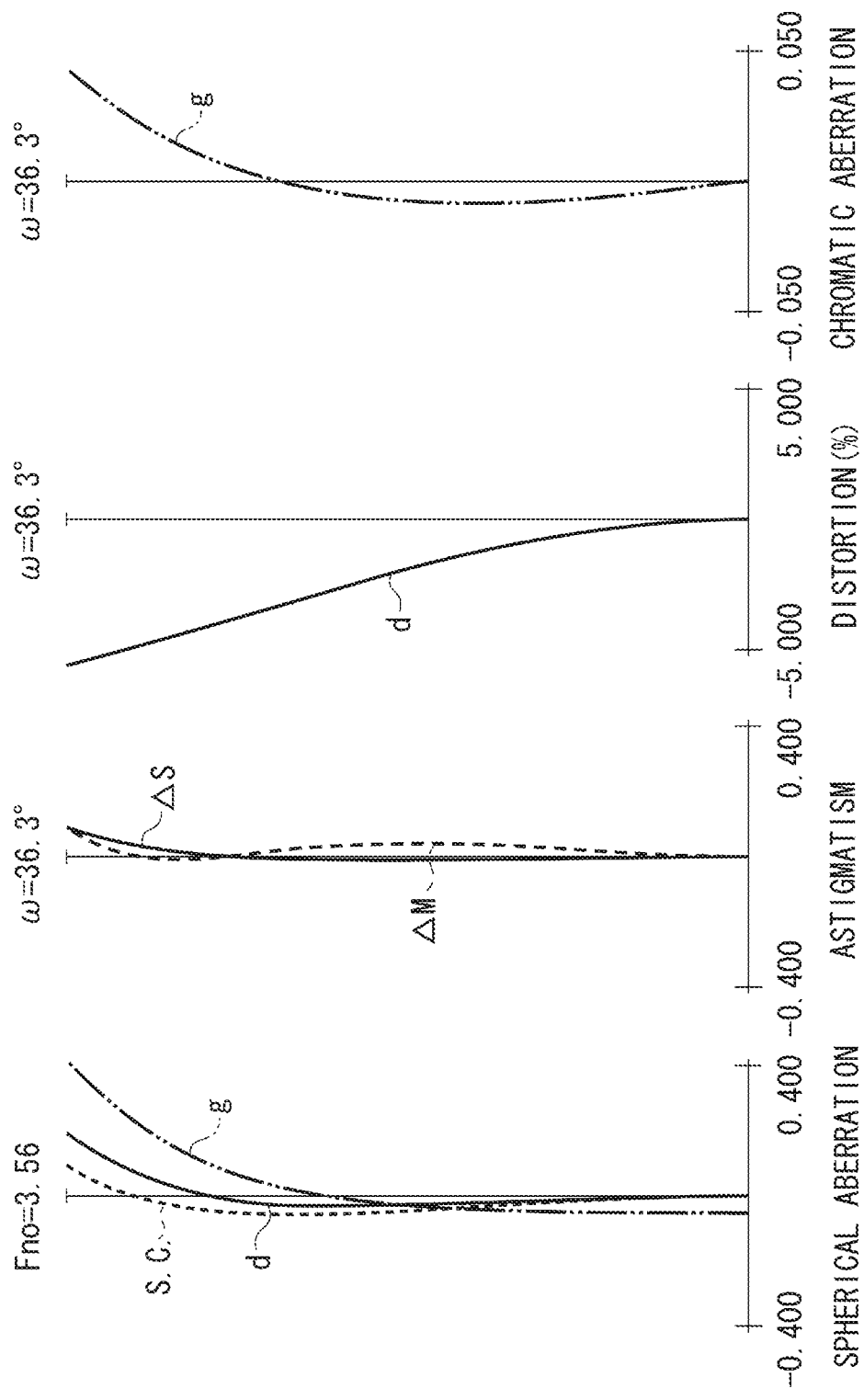
FIGS. 2A and 2B are aberration diagrams at the wide-angle end and a telephoto end of the zoom lens according to the first exemplary embodiment of the present invention, respectively.
Figure 2B:
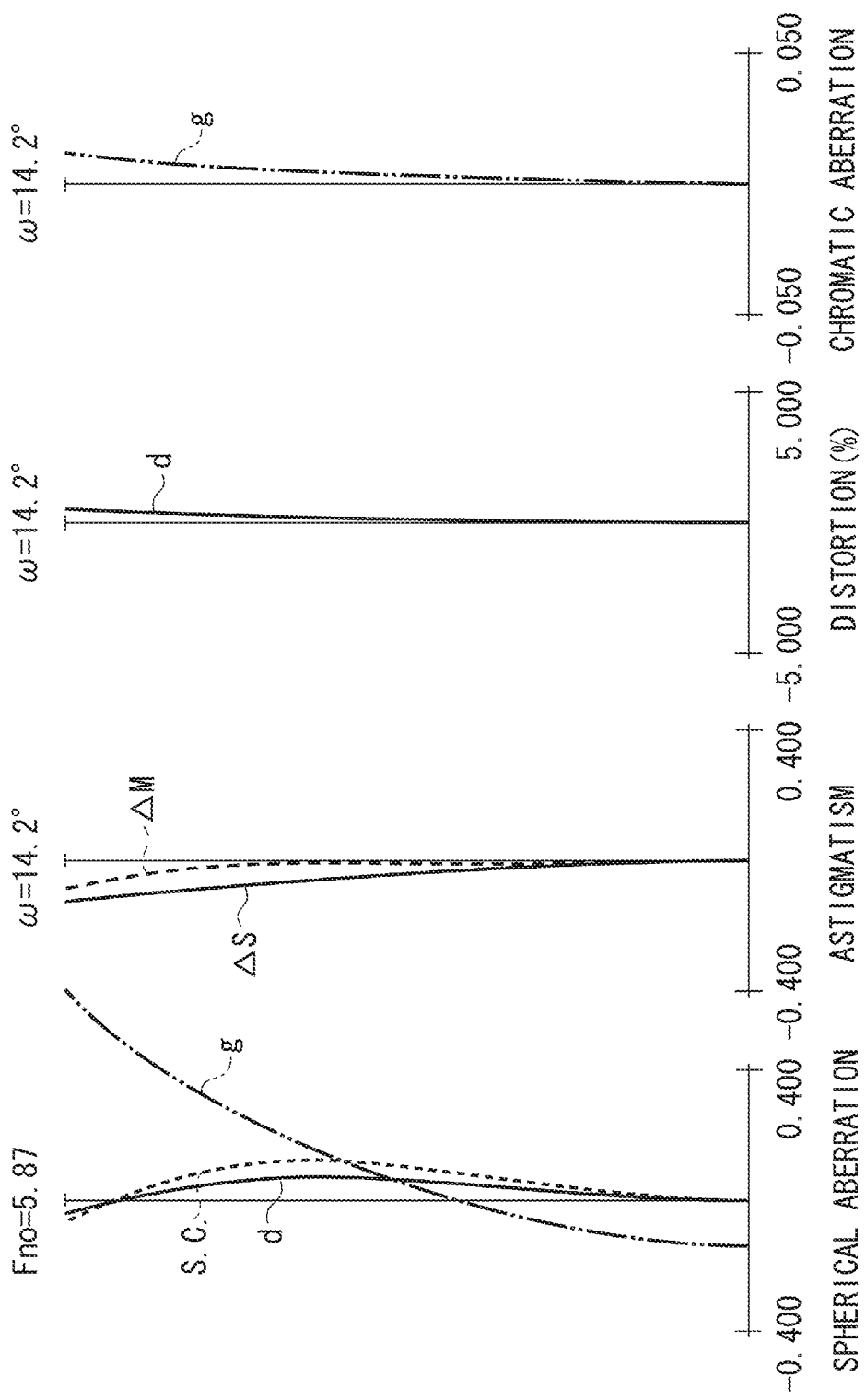

FIGS. 2A and 2B are aberration diagrams at the wide-angle end and a telephoto end (long focal length end) of the zoom lens according to the first exemplary embodiment of the present invention, respectively.

Figure 3:
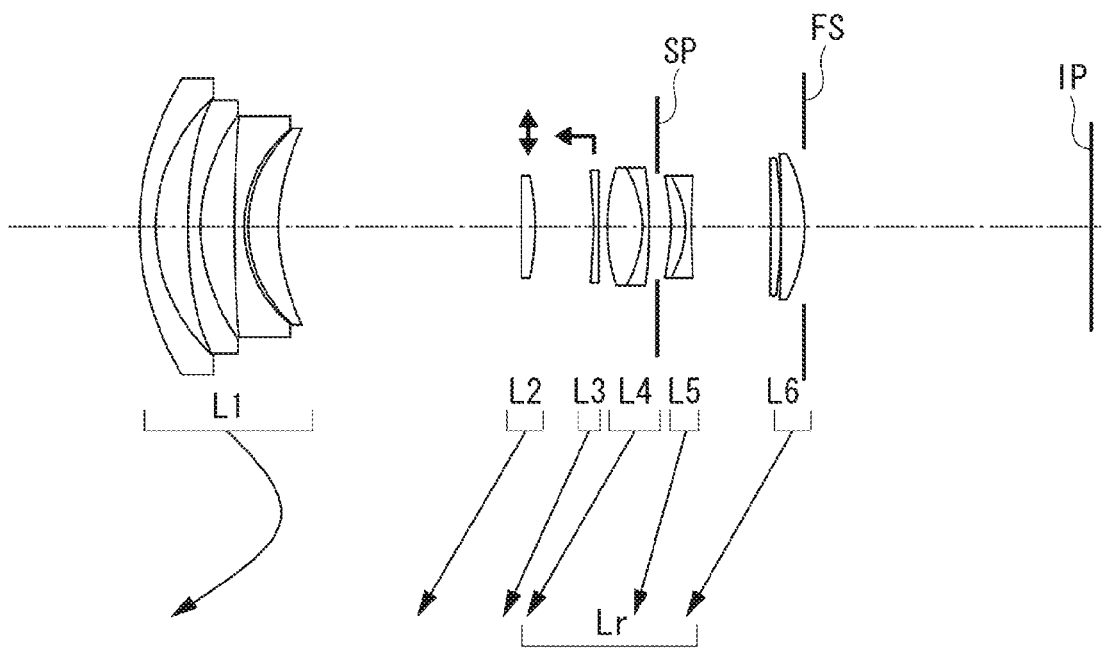
FIG. 3 is a lens cross-sectional view at a wide-angle end of a zoom lens according to a second exemplary embodiment of the present invention.
Figure 4A:
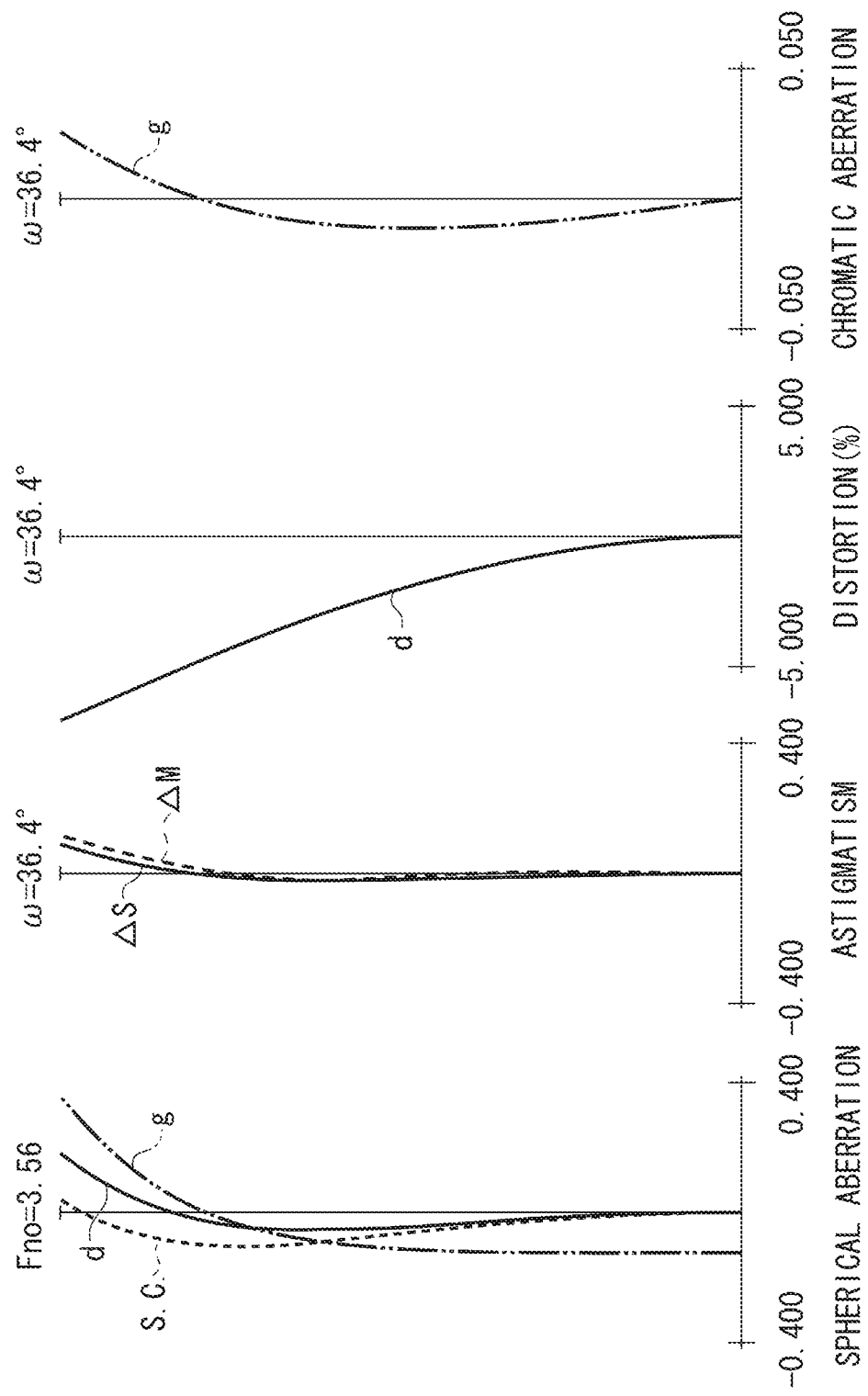
FIGS. 4A and 4B are aberration diagrams at the wide-angle end and a telephoto end of the zoom lens according to the second exemplary embodiment of the present invention, respectively.
Figure 4B:
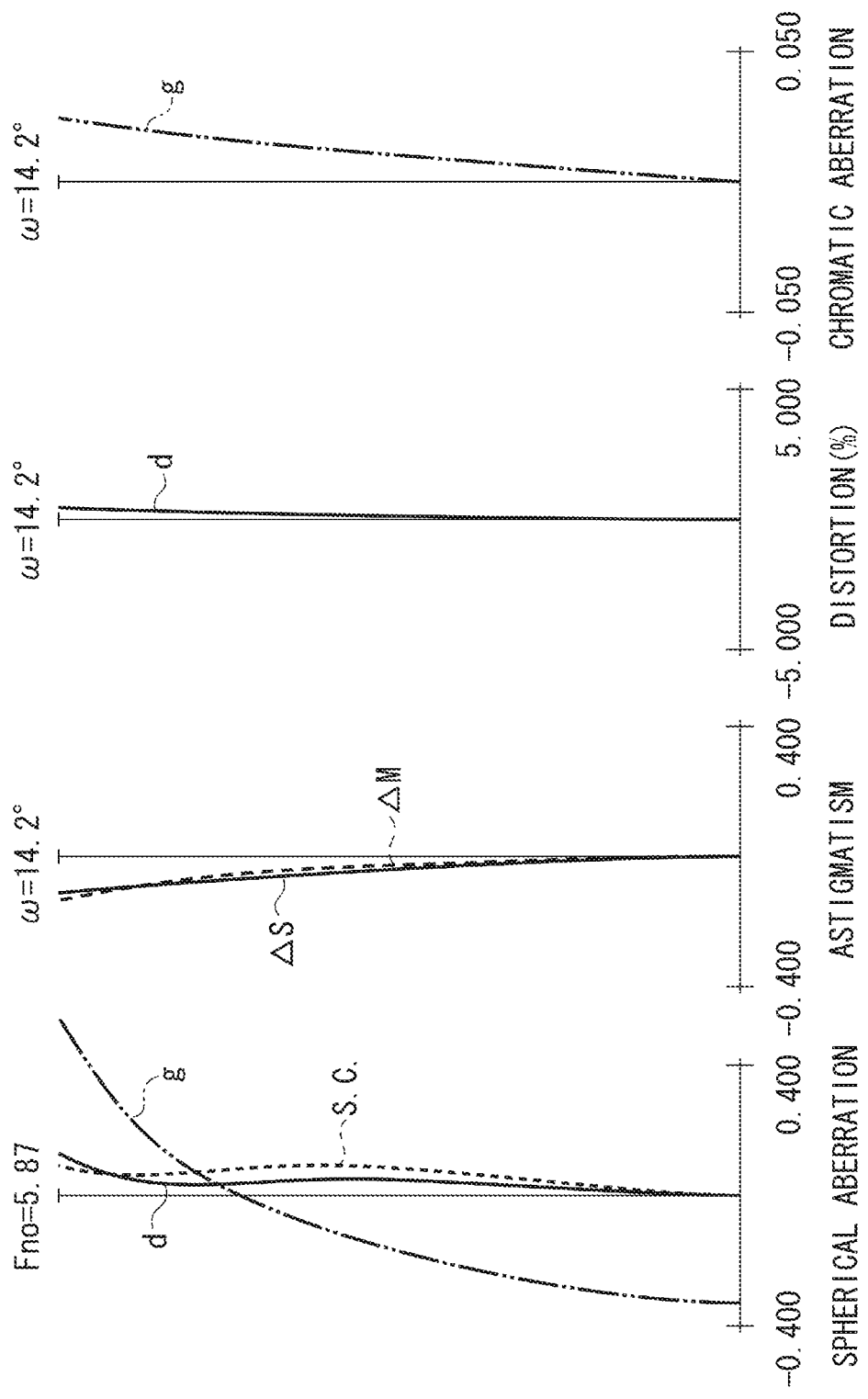

FIG. 3 is a lens cross-sectional view at a wide-angle end of a zoom lens according to a second exemplary embodiment of the present invention. FIGS. 4A and 4B are aberration diagrams at the wide-angle end and a telephoto end of the zoom lens according to the second exemplary embodiment of the present invention, respectively.

Figure 5:
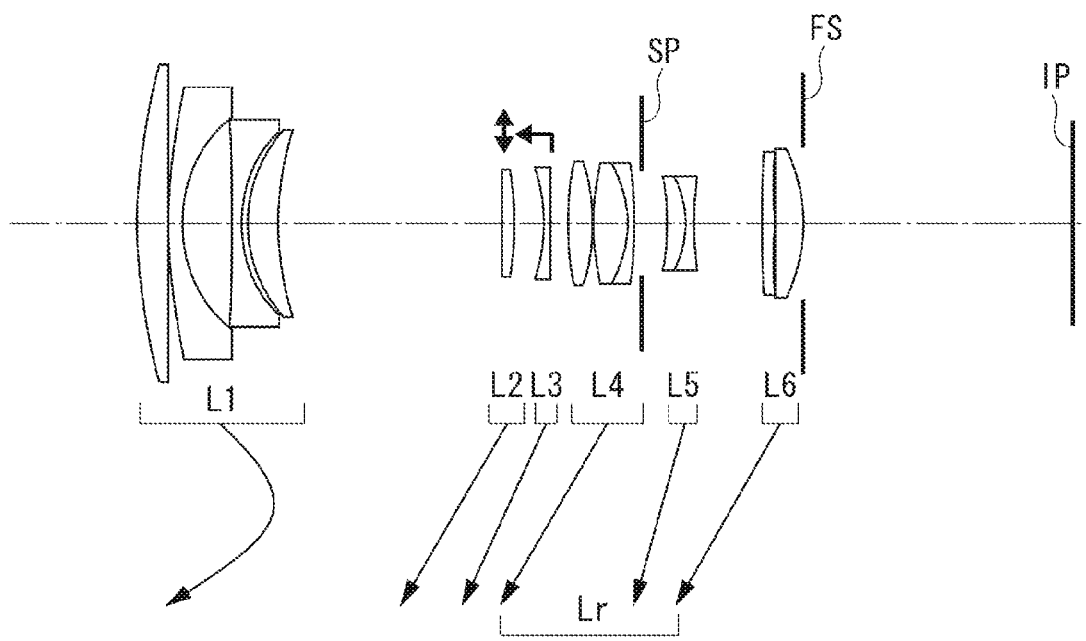
FIG. 5 is a lens cross-sectional view at a wide-angle end of a zoom lens according to a third exemplary embodiment of the present invention.

FIG. 5 is a lens cross-sectional view at a wide-angle end of a zoom lens according to a third exemplary embodiment of the present invention. FIGS. 6A and 6B are aberration diagrams at the wide-angle end and a telephoto end of the zoom lens according to the third exemplary embodiment of the present invention, respectively.

Figure 7:
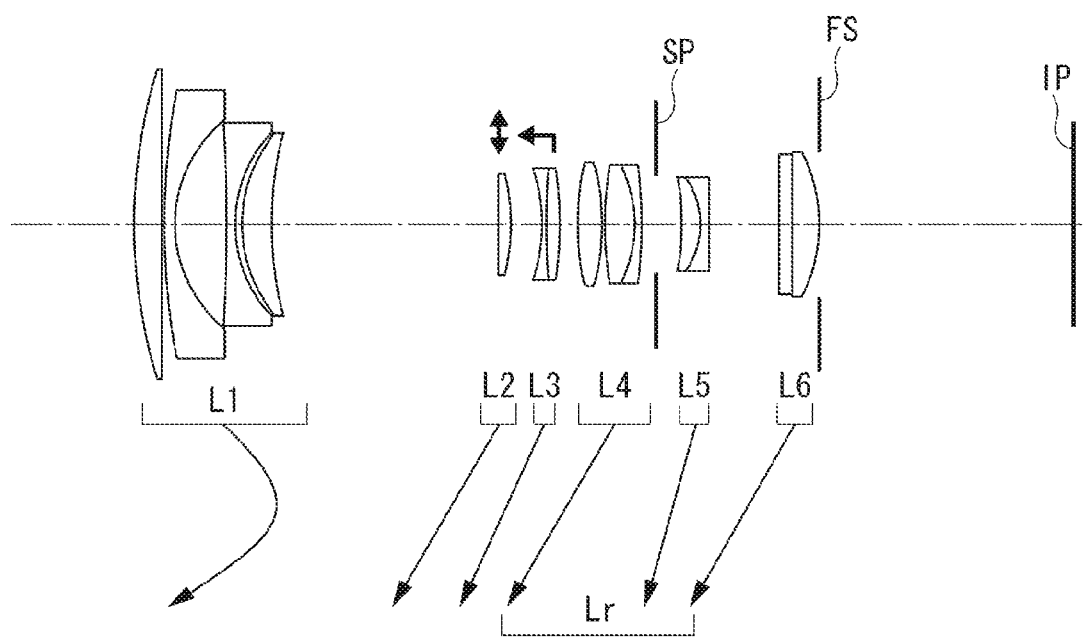
FIG. 7 is a lens cross-sectional view at a wide-angle end of a zoom lens according to a fourth exemplary embodiment of the present invention.
Figure 8A:
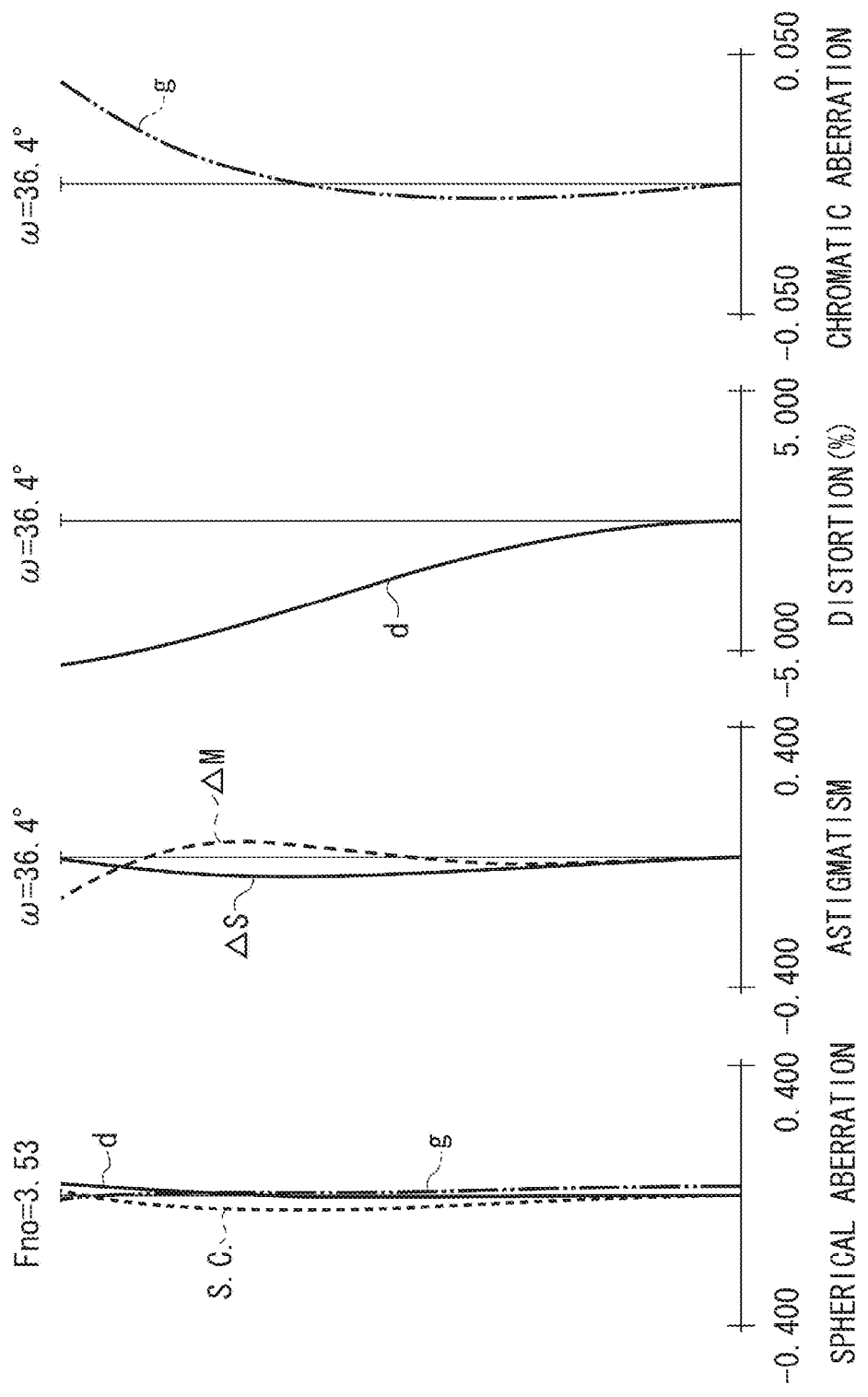
FIGS. 8A and 8B are aberration diagrams at the wide-angle end and a telephoto end of the zoom lens according to the fourth exemplary embodiment of the present invention, respectively.
Figure 8B:
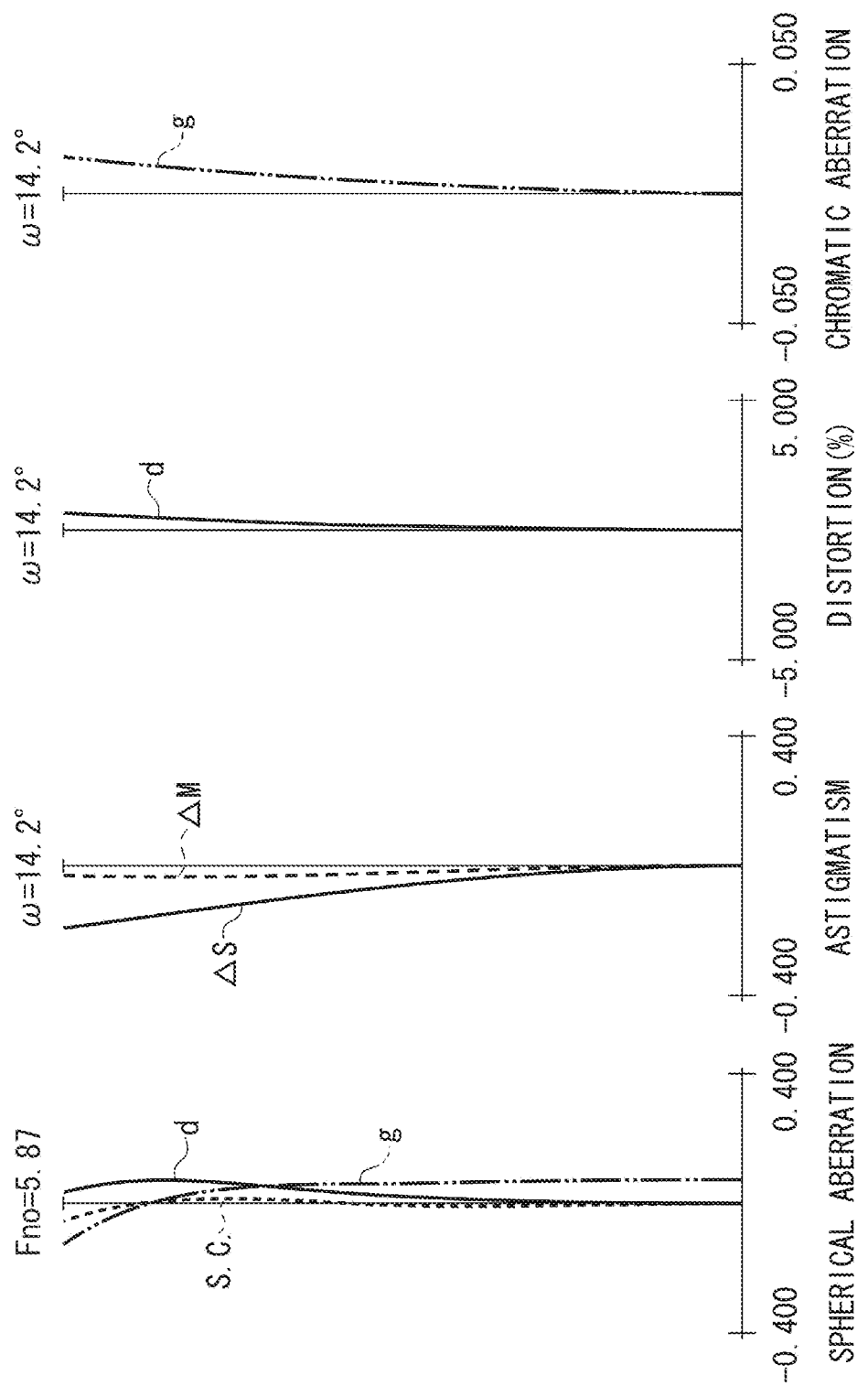

FIG. 7 is a lens cross-sectional view at a wide-angle end of a zoom lens according to a fourth exemplary embodiment of the present invention. FIGS. 8A and 8B are aberration diagrams at the wide-angle end and a telephoto end of the zoom lens according to the fourth exemplary embodiment, respectively.

Figure 9:
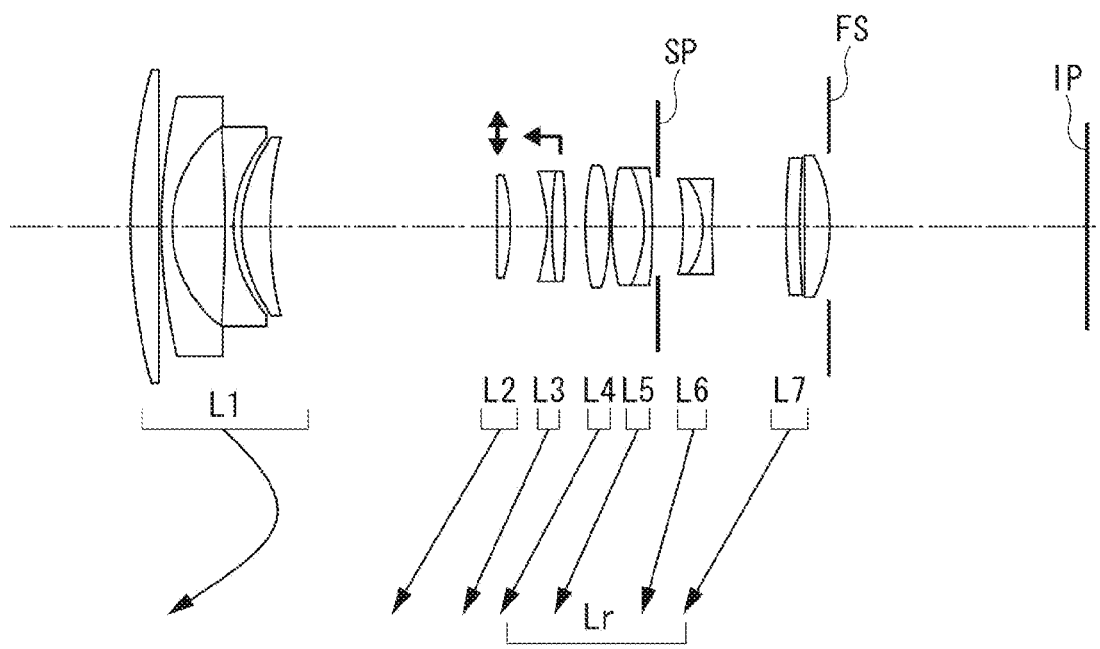
FIG. 9 is a lens cross-sectional view at a wide-angle end of a zoom lens according to a fifth exemplary embodiment of the present invention.
Figure 10A:
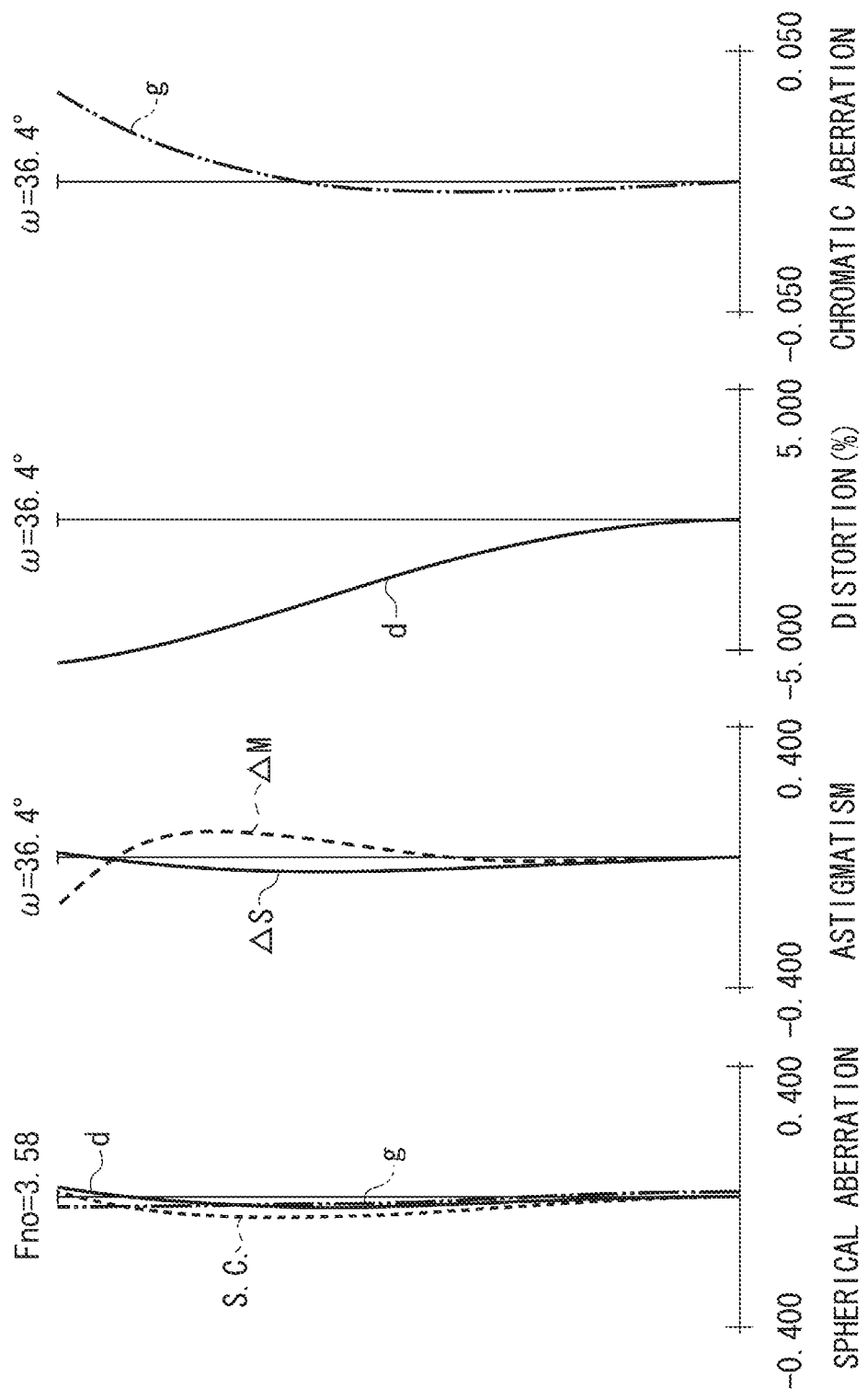
FIGS. 10A and 10B are aberration diagrams at the wide-angle end and a telephoto end of the zoom lens according to the fifth exemplary embodiment of the present invention, respectively.
Figure 10B:
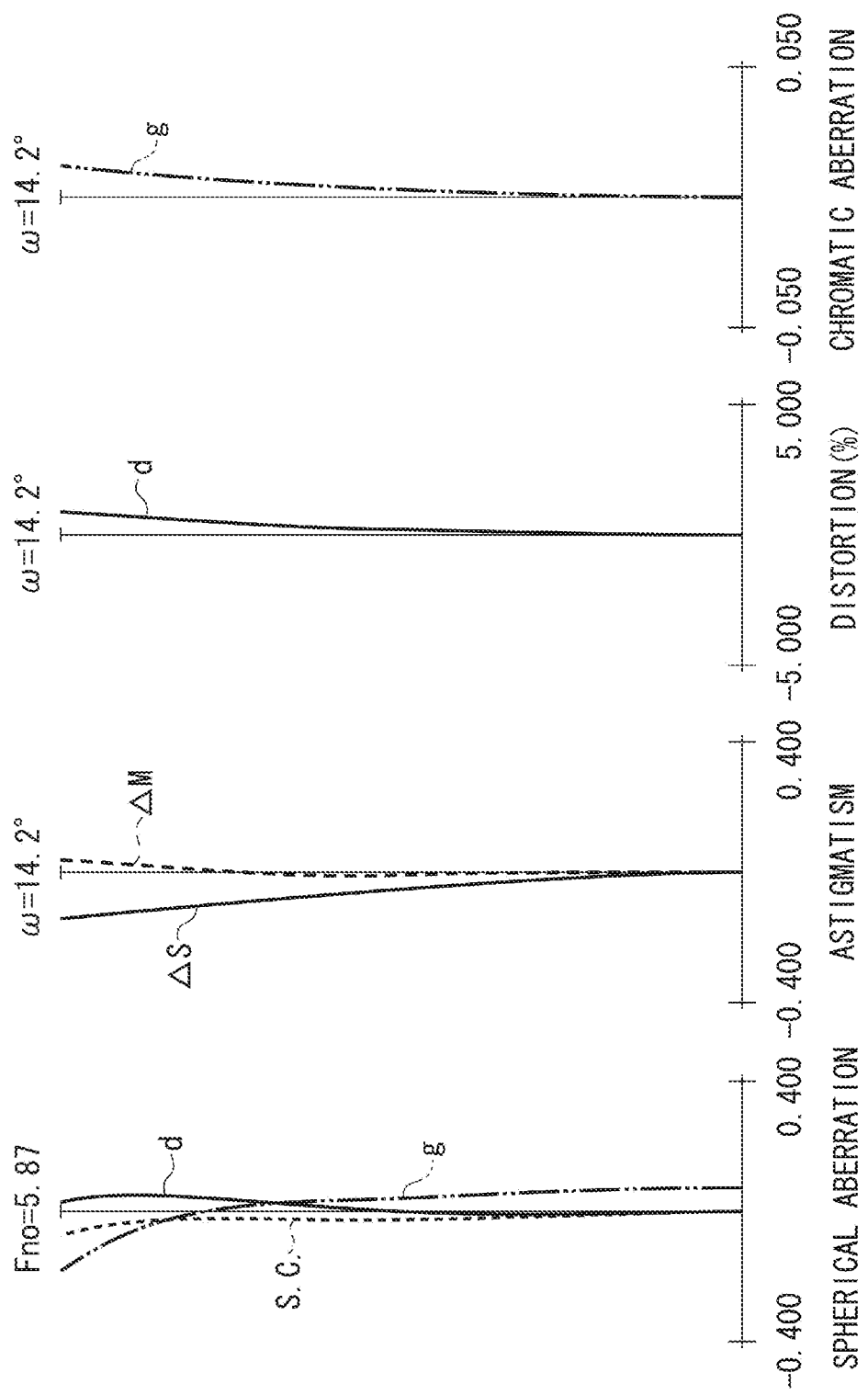

FIG. 9 is a lens cross-sectional view at a wide-angle end of a zoom lens according to a fifth exemplary embodiment of the present invention. FIGS. 10A and 10B are aberration diagrams at the wide-angle end and a telephoto end of the zoom lens according to the fifth exemplary embodiment, respectively.

Figure 11:
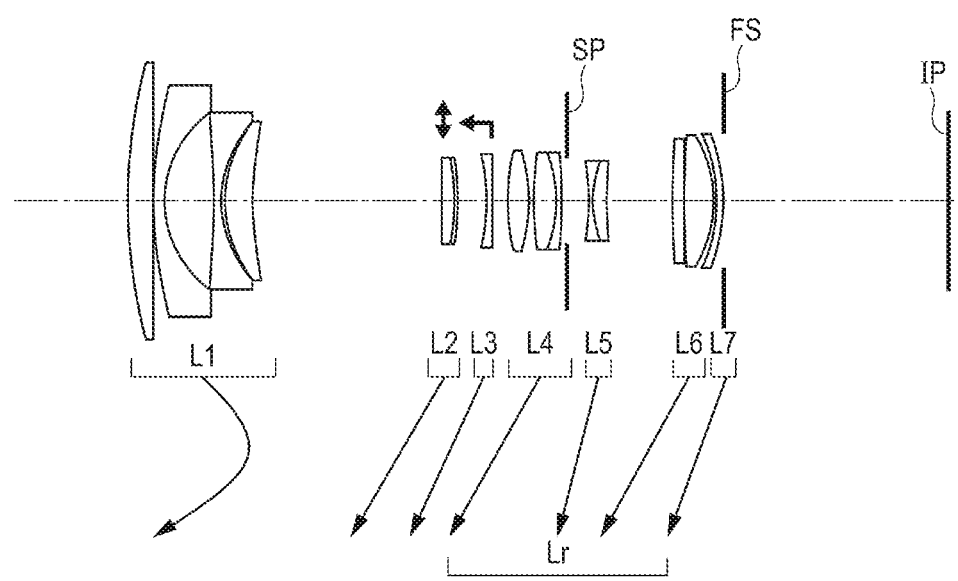
FIG. 11 is a lens cross-sectional view at a wide-angle end of a zoom lens according to a sixth exemplary embodiment of the present invention.
Figure 12A:
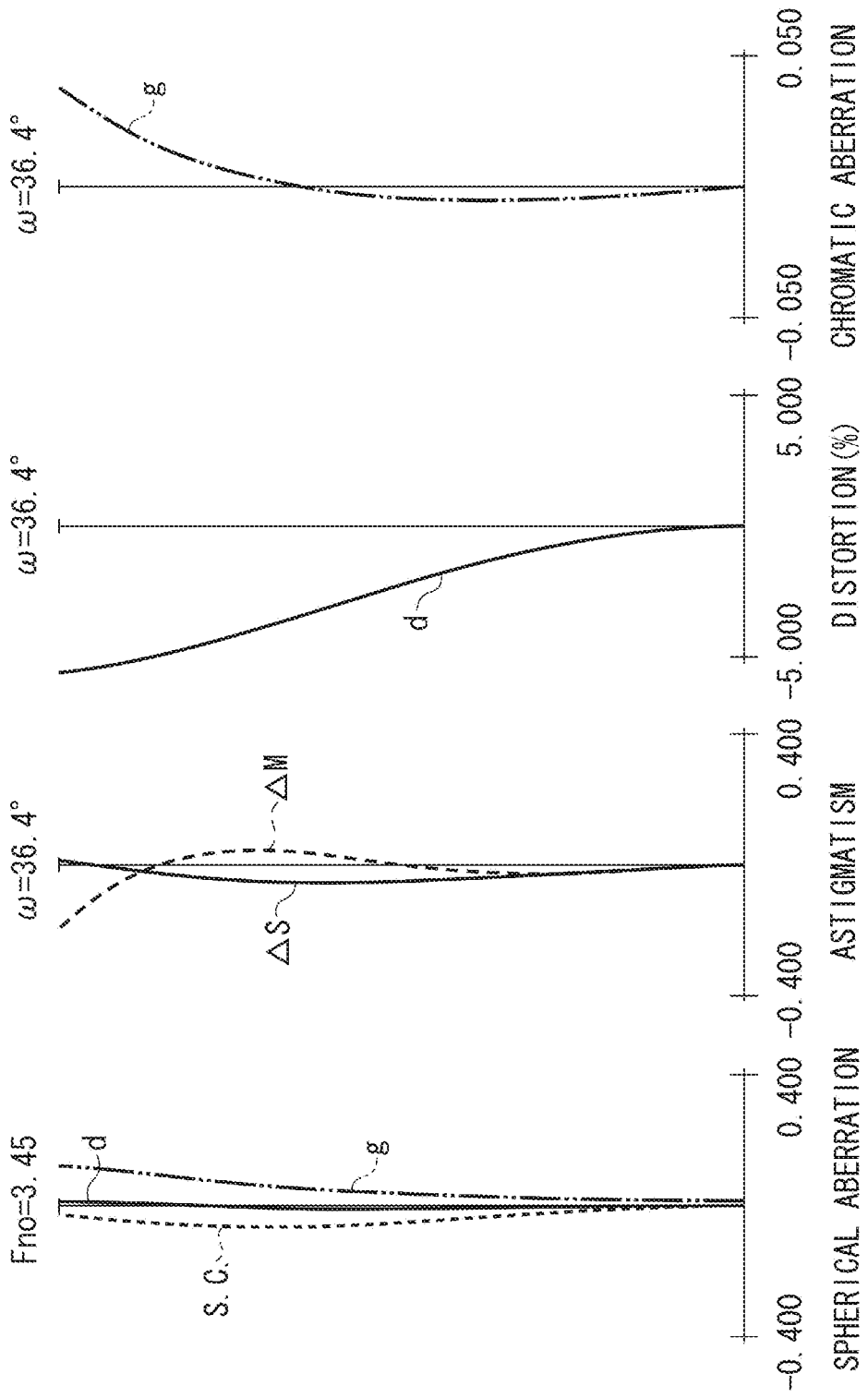
FIGS. 12A and 12B are aberration diagrams at the wide-angle end and a telephoto end of the zoom lens according to the sixth exemplary embodiment of the present invention, respectively.
Figure 12B:
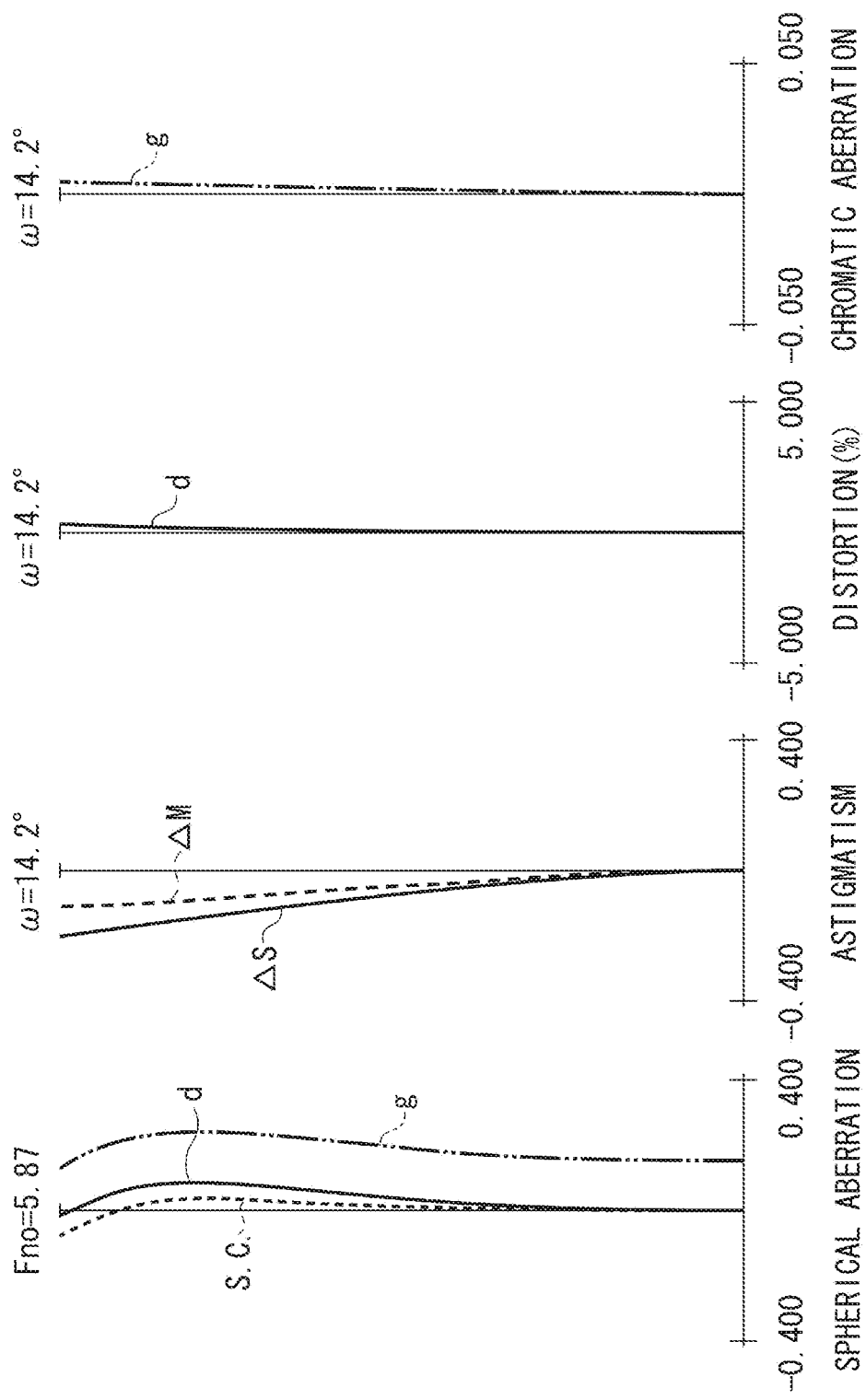

FIG. 11 is a lens cross-sectional view at a wide-angle end of a zoom lens according to a sixth exemplary embodiment of the present invention. FIGS. 12A and 12B are aberration diagrams at the wide-angle end and a telephoto end of the zoom lens according to the sixth exemplary embodiment, respectively.

Figure 13:
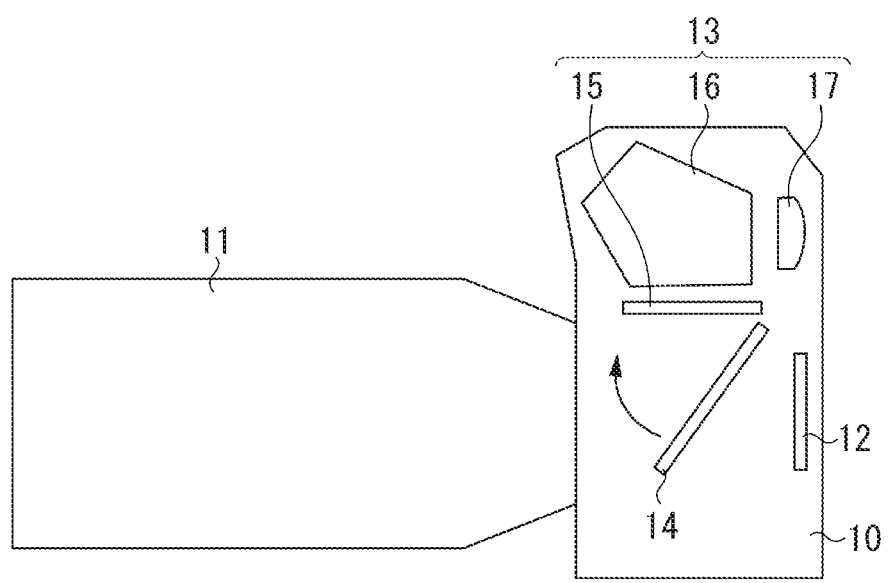
FIG. 13 is a schematic diagram of an image pickup apparatus according to an exemplary embodiment of the present invention.

FIG. 13 is a schematic diagram of a digital camera (image pickup apparatus) equipped with a zoom lens according to an exemplary embodiment of the present invention.

In the lens cross-sectional views illustrated in FIGS. 1, 3, 5, 7, 9, and 11, the left hand side is the object side and the right hand side is the image side.

Each of the zoom lenses according to the first to sixth exemplary embodiments includes a first lens unit L1 having negative refractive power (the reciprocal of the focal length), a second lens unit L2 having positive refractive power, and a third lens unit L3 having negative refractive power.

In the zoom lenses according to the first to fourth exemplary embodiments, a rear lens group Lr having overall positive refractive power includes a fourth lens unit L4 having positive refractive power, a fifth lens unit L5 having negative refractive power, and a sixth lens unit L6 having positive refractive power.

In the zoom lens according to the fifth exemplary embodiment, a rear lens group Lr having overall positive refractive power includes a fourth lens unit L4 having positive refractive power, a fifth lens unit L5 having positive refractive power, a sixth lens unit L6 having negative refractive power, and a seventh lens unit L7 having positive refractive power.

In the zoom lens according to the sixth exemplary embodiment, a rear lens group Lr having overall positive refractive power includes a fourth lens unit L4 having positive refractive power, a fifth lens unit L5 having negative refractive power, a sixth lens unit L6 having positive refractive power, and a seventh lens unit L7 having negative refractive power.

However, the rear lens group Lr according to each of the exemplary embodiments of the present invention needs to include a plurality of lens units and have overall positive refractive power and is not limited to the configurations described above.

An aperture stop SP for adjusting the amount of light is arranged between the fourth lens unit L4 and the fifth lens unit L5 in each of the zoom lenses according to the first to fourth, and sixth exemplary embodiments, and between the fifth lens unit L5 and the sixth lens unit L6 in the zoom lens according to the fifth exemplary embodiment. A flare-cut stop FS of an invariant opening size is arranged at the side nearest to the image of each zoom lens of the first to sixth exemplary embodiments. However, the arrangements of the aperture stop SP and the flare-cut stop FS are not limited to the arrangements described above.

When a zoom lens is used as a photographic optical system for a video camera or a digital still camera, an image plane IP corresponds to a solid-state image sensor, such as a charge-coupled device (CCD) sensor or a complementary metal-oxide semiconductor (CMOS) sensor. In the case of a silver-halide film camera, the image plane IP corresponds to a film surface.

In the aberration diagrams, d and g correspond to the d-line (wavelength 587.56 nm) and g-line (wavelength 435.8 nm) of the Fraunhofer lines, respectively. S.C. stands for sine condition. $\Delta M$ and $\Delta S$ correspond to a meridional image plane and a sagittal image plane at the d-line, respectively. The distortion is indicated at the d-line, and chromatic aberration of magnification (lateral chromatic aberration) is indicated at the g-line. In the aberration diagrams, $\omega$ denotes a half angle of view and Fno denotes an F-number.

The wide-angle end and the telephoto end of each exemplary embodiment are zoom positions assumed when the second lens unit L2 as a variable power lens unit is positioned at the respective ends of a range in which the second lens unit L2 is movable along the optical axis.

During zooming from the wide-angle end to the telephoto end, each lens unit in the zoom lens moves in an optical axis direction by changing distances between the adjacent lens units as indicated by arrows in the lens cross-sectional view.

To reduce the sizes of a focus lens unit and an image stabilization lens unit in a zoom lens which includes a lens unit having negative refractive power arranged at the side nearest to the object, lens units having relatively small lens diameters and arranged nearer to the image side than the first lens unit need to be selected as the focus lens unit and the image stabilization lens unit.

To reduce the weights of the focus lens unit and the image stabilization lens unit, each of these lens units is desirably composed of a single lens element. The term "lens element" here refers to an integrated lens, such as a single lens, a cemented lens including a plurality of lenses cemented, and a replica aspheric lens including a spherical lens laminated with a resin layer on the surface.

When the focus lens unit is composed of a small number of lenses, the focus lens unit tends to have small refractive power (the reciprocal of the focal length) to suppress the aberration variation associated with focusing. However, when the refractive power of the focus lens unit becomes too small, the amount of drawing out the focus lens unit (the amount of movement of the focus lens unit toward the object side) increases and, accordingly, the entire zoom lens becomes larger during focusing from the infinite distance to the closest distance. To make the focus lens unit more compact and lighter, and to make the entire zoom lens more compact while improving the optical performance of the entire zoom lens, it is important to configure the lenses to have relatively smaller aberration variation associated with focusing while appropriately setting the refractive power of the focus lens unit.

In the zoom lens according to each of the exemplary embodiments of the present invention, each of the second lens unit L2 and the third lens unit L3 consists of a single lens element, the second lens unit L2 moves in a direction having a component perpendicular to an optical axis (nonparallel to the optical axis) during image shake correction, and the third lens unit L3 moves in an optical axis direction during focusing.

The second lens unit L2 and the third lens unit L3, each of which consists of a single lens element and has a relatively small lens diameter, are used as the image stabilization lens unit and the focus lens unit in the zoom lens which has the lens unit having negative refractive power arranged at the side nearest to the object. As a result, the lens diameters of the second lens unit L2 and the third lens unit L3 are reduced. That can reduce the weights of the focus lens unit and the image stabilization lens unit and can prevent the driving units for these lens units from being larger.

The size of the entire zoom lens can be reduced as a result of arranging the focus lens unit and the image stabilization lens unit at the object side of the zoom lens in which a space can be easily reserved, since both of the focus lens unit and the image stabilization lens unit are equipped with the driving units which tend to be large.

The aberration variation associated with focusing can be also reduced, since the second lens unit L2 having positive refractive power can converge the axial light flux which is diffused from the first lens unit L1, and, therefore, can mitigate the fluctuation of the height of axial light caused by focusing. Accordingly, since the focus lens unit can be configured to have appropriate refractive power while including a single lens element, the weight of the focus lens unit can be reduced.

In the zoom lens according to each of the exemplary embodiments of the present invention, both of conditions (1) and (2) below are satisfied when the focal length of the entire zoom lens at the wide-angle end is denoted by fw, the focal length of the second lens unit L2 is denoted by f2, and the focal length of the third lens unit L3 is denoted by f3:

$$2.8 < f2/fw < 4.4 \tag{1}$$

$$1.8 < |f3|/fw < 4.5 \tag{2}$$

The condition (1) is for suitably setting the refractive power of the second lens unit L2 to appropriately converge the light flux incident to the third lens unit L3, which is the focus lens unit, while reserving the satisfactory image stabilization performance. When the value is less than the lower limit of the condition (1), the refractive power of the second lens unit L2 becomes so strong that the fluctuation of the optical performance during image stabilization (during image shake correction) becomes difficult to reduce, which is not desirable. When the value is greater than the upper limit of the condition (1), the refractive power of the second lens unit L2 becomes so weak that the decentration sensitivity during image stabilization becomes small. This makes it necessary to increase the amount of movement of the image stabilization lens unit, and as a result, an image stabilization unit including the image stabilization lens unit and a driving mechanism for the image stabilization lens unit becomes large, which is not desirable. In addition, the convergence of the axial light flux incident to the third lens unit L3 becomes weak and the fluctuation of the height of axial light becomes large, and as a result, the aberration variation associated with focusing becomes difficult to reduce, which is not desirable.

The condition (2) is for balancing between high optical performance and downsizing by suitably setting the refractive power of the third lens unit L3. When the value is less than the lower limit of the condition (2), the absolute value of the refractive power of the third lens unit L3 becomes so small that the aberration variation associated with focusing becomes difficult to reduce while maintaining the configuration of the third lens unit L3 of a small number of lenses, which is not desirable. When the value is greater than the upper limit of the condition (2), the absolute value of the refractive power of the third lens unit L3 becomes too large. As a result, the amount of drawing out the focus lens unit (the amount of movement of the focus lens unit to the object side) during focusing from the infinite distance to the closest distance increases, reducing the focus speed, which is not desirable. In addition, the entire zoom lens becomes large, which is not desirable either.

Ranges of the numerical values for the conditions (1) and (2) can be set as follows:

$$3.1 < f2/fw < 4.3 \tag{1a}$$

$$2.0 < |f3|/fw < 4.3 \tag{2a}$$

Although the zoom lens according to the embodiments of the present invention can be implemented by the above-described configuration, it is desirable to satisfy at least one of the conditions below to realize further downsizing and higher optical performance.

In each of the exemplary embodiments of the present invention, the conditions below are satisfied when the thickness of the second lens unit L2 along the optical axis is denoted by d2 and the thickness of the third lens unit L3 along the optical axis is denoted by d3:

$$0.05 < d2/fw < 0.20 \tag{3}$$

$$0.02 < d3/fw < 0.20 \tag{4}$$

The conditions (3) and (4) relate to the thicknesses of the second lens unit L2 and the third lens unit L3 along the optical axis. The thickness of a lens unit along the optical axis (lens configuration length) is a distance along the optical axis between a lens surface nearest to the object side of the lens unit and a lens surface nearest to the image side of the lens unit. When the values are less than the lower limits of the conditions (3) and (4), the thickness of each lens unit along the optical axis becomes so thin that each lens becomes difficult to process, which is not desirable. When the values are greater than the upper limits of the conditions (3) and (4), the thickness of each lens unit along the optical axis becomes so thick that the entire zoom lens becomes large, which is not desirable.

Ranges of the numerical values for the conditions (3) and (4) can be set as follows:

$$0.07 < d2/fw < 0.17 \quad (3a)$$

$$0.03 < d3/fw < 0.17 \quad (4a)$$

Each of the exemplary embodiments of the present invention satisfies a condition below, when a radius of curvature of a lens surface nearest to the object side of the second lens unit L2 is denoted by R2o and a radius of curvature of a lens surface nearest to the image side of the second lens unit L2 is denoted by R2i:

$$-2.3 < (R2i - R2o)/(R2i + R2o) < -0.5 \quad (5)$$

The condition (5) is for balancing between downsizing and higher performance of the zoom lens. When the value is less than the lower limit of the condition (5), the refractive power of the second lens unit L2 becomes so large that the field tilt and the coma variation during image stabilization become difficult to reduce, which is not desirable. When the value is greater than the upper limit of the condition (5), the refractive power of the second lens unit L2 becomes so small that the decentration sensitivity during image stabilization becomes low. Therefore, the driving amount of the lens unit increases, and as a result, a driving unit becomes large, which is not desirable.

Ranges of the numerical values for the condition (5) can be set as follows:

$$-2.2 < (R2i - R2o)/(R2i + R2o) < -0.7 \quad (5a).$$

Each of the exemplary embodiments of the present invention satisfies a condition below, when a focal length of the entire zoom lens at the telephoto end is denoted by ft, a focal length of an i-th lens of the third lens unit L3 from the object side is denoted by f3i, and an Abbe number of the i-th lens of the third lens unit L3 from the object side is denoted by vd3i:

$$-0.025 < \Sigma((ft/f3i)/vd3i) < -0.010 \quad (6).$$

The condition (6) relates to the focal length and the Abbe number of the third lens unit L3 and is useful for setting an achromatic condition. When the value is less than the lower limit of the condition (6), the residual chromatic aberration of the third lens unit L3 becomes so large that the variation of the chromatic aberration associated with focusing becomes difficult to reduce particularly at the telephoto end where the amount of movement during focusing is large, which is not desirable. When the value of the condition (6) is greater than the upper limit thereof, the number of lenses included in the third lens unit L3 increases or the refractive power of the third lens unit L3 becomes too small. As a result, the amount of movement during focusing increases and the entire zoom lens becomes large, which is not desirable.

Ranges of the numerical values for the condition (6) can be set as follows:

$$-0.022 < \Sigma((ft/f3i)/vd3i) < -0.012 \quad (6a).$$

Each of the exemplary embodiments of the present invention satisfies a condition below, when a lateral magnification of the third lens unit L3 at the wide-angle end is denoted by β3w and a lateral magnification of the rear lens group Lr at the wide-angle end is denoted by βrw:

$$0.17 < (1 - \beta 3w^2) \times \beta rw^2 < 1.80 \quad (7).$$

The condition (7) sets an appropriate focus sensitivity for suppressing the aberration variation associated with focusing while constituting the focus lens unit with a small number of lenses. When the value is less than the lower limit of the condition (7), the focus sensitivity of the third lens unit L3 becomes so small that the amount of movement during focusing increases. As a result, the entire zoom lens becomes large and the fluctuation of the light incidence height increases, making it difficult to suppress the aberration variation associated with focusing. This also results in larger variation of the image magnification associated with the wobbling operation, which is not desirable. When the value is greater than the upper limit of the condition (7), the focus sensitivity of the third lens unit L3 becomes so large that a drive system becomes difficult to control, which is not desirable. In addition, since the refractive power of the third lens unit L3 becomes so large that the aberration variation associated with focusing becomes difficult to suppress, which is not desirable.

Ranges of the numerical values for the condition (7) can be set as follows:

$$0.20 < (1 - \beta 3w^2) \times \beta rw^2 < 1.60 \quad (7a).$$

Each of the exemplary embodiments of the present invention satisfies a condition below, when lateral magnifications of the rear lens group Lr at the wide-angle end and the telephoto end are denoted by βrw and βrt, respectively and the focal lengths of the entire zoom lens at the wide-angle end and the telephoto end are denoted by fw and ft, respectively:

$$0.70 < (\beta rt \times fw)/(\beta rw \times ft) < 1.40 \quad (8).$$

The condition (8) relates to the lateral magnifications at the wide-angle end and the telephoto end during focusing on the infinite distance at the rear lens group Lr and is for appropriately setting allocation of magnifications in the rear lens group Lr.

When the value is less than the lower limit of the condition (8), the allocation of magnifications in the rear lens group Lr becomes so small that the allocations of magnifications in the second lens unit L2 and the third lens unit L3 become large. As a result, the performance of the second lens unit L2 and the third lens unit L3 becomes difficult to maintain with simple lens configurations, which is not desirable. When the value is greater than the upper limit of the condition (8), the allocation of magnifications in the rear lens group Lr becomes so large and, accordingly, the refractive powers of the lens units included in the rear lens group Lr become so strong. As a result, particularly the image plane variation and the variation of the lateral chromatic aberration during zooming become difficult to correct, which is not desirable.

Ranges of the numerical values for the condition (8) can be set as follows:

$$0.80 < (\beta rt \times fw)/(\beta rt \times ft) < 1.25 \quad (8a)$$

In each of the exemplary embodiments of the present invention, during zooming from the wide-angle end to the telephoto end, the first lens unit L1 moves along a locus convex toward the image side. The total lens length is easily reduced by configuring the zoom lens to move the first lens unit L1 along a locus convex toward the image side during zooming from the wide-angle end to the telephoto end. By shortening the total lens length at the wide-angle end, the lens diameter of the first lens unit L1, which is the largest lens diameter, can be shortened.

In each of the exemplary embodiments of the present invention, during zooming from the wide-angle end to the telephoto end, the second lens unit L2 and the third lens unit L3 move toward the object side. This facilitates suppression of increase in the total lens length at the wide-angle end. All the lens units included in the rear lens group move toward the object side during zooming from the wide-angle end to the telephoto end.

In each of the exemplary embodiments of the present invention, the image stabilization lens unit and the focus lens unit are arranged at the second lens unit L2 and the third lens unit L3, respectively. A part of space in a relatively wide distance between the first lens unit L1 and the second lens unit L2 can be used for arranging the driving units for driving the image stabilization lens unit and the focus lens unit, respectively.

Next, the specific lens configuration of each exemplary embodiment will be described.

According to the first exemplary embodiment, the first lens unit L1 includes, in order from the object side to the image side, a meniscus positive lens with its convex surface facing the object side, a meniscus negative lens with its concave surface facing the image side, a meniscus negative lens with its concave surface facing the image side, and a meniscus positive lens with its convex surface facing the object side. The second lens unit L2 includes a single biconvex lens. The third lens unit L3 includes a single biconcave lens. The fourth lens unit L4 includes a cemented lens including a biconvex lens and a meniscus negative lens with its concave surface facing the object side in order from the object side to the image side. The fifth lens unit L5 includes a cemented lens including a meniscus positive lens with its convex surface facing the image side and a biconcave lens in order from the object side to the image side. The sixth lens unit L6 includes two meniscus positive lenses with their convex surfaces facing the image side.

According to the second exemplary embodiment, the first lens unit L1 includes, in order from the object side to the image side, three meniscus negative lenses with their concave surfaces facing the image side, and a meniscus positive lens with its convex surface facing the object side. The sixth lens unit L6 includes a meniscus positive lens with its convex surface facing the image side and a biconvex lens. The configuration of the other lens units are similar to those of the first exemplary embodiment.

According to the third exemplary embodiment, the first lens unit L1 includes, in order from the object side to the image side, a plano-convex lens with its convex surface facing the object side, a meniscus negative lens with its concave surface facing the image side, a biconcave lens, and a meniscus positive lens with its convex surface facing the object side. The third lens unit L3 includes a meniscus negative lens with its concave surface facing the object side. The fourth lens unit L4 includes, in order from the object side to the image side, a biconvex lens and a cemented lens which includes a biconvex lens and a meniscus negative lens with its concave surface facing the object side. The sixth lens unit L6 includes, in order from the object side to the image side, a biconvex lens and a plano-convex lens with its convex surface facing the image side. The configuration of the other lens units are similar to those of the first exemplary embodiment.

According to the fourth exemplary embodiment, the first lens unit L1 includes, in order from the object side to the image side, a plano-convex lens with its convex surface facing the object side, a meniscus negative lens with its concave surface facing the image side, a biconcave lens, and a meniscus positive lens with its convex surface facing the object side. The third lens unit L3 includes a cemented lens including a meniscus negative lens with its concave surface facing the object side and a biconvex lens. The fourth lens unit L4 includes, in order from the object side to the image side, a biconvex lens and a cemented lens which includes a biconvex lens and a meniscus negative lens with its concave surface facing the object side. The sixth lens unit L6 includes, in order from the object side to the image side, a biconvex lens and a plano-convex lens with its convex surface facing the image side. The configuration of the other lens units are similar to those of the first exemplary embodiment.

According to the fifth exemplary embodiment, the first lens unit L1 includes, in order from the object side to the image side, a plano-convex lens with its convex surface facing the object side, a meniscus negative lens with its concave surface facing the image side, a biconcave lens, and a meniscus positive lens with its convex surface facing the object side. The second lens unit L2 includes a meniscus positive lens with its concave surface facing the object side. The third lens unit L3 includes a cemented lens including a biconcave lens and a biconvex lens. The fourth lens unit L4 includes a single biconvex lens. The fifth lens unit L5 includes a cemented lens including a biconvex lens and a meniscus negative lens with its concave surface facing the object side in order from the object side to the image side. The sixth lens unit L6 includes a cemented lens including a meniscus positive lens with its convex surface facing the image side and a biconcave lens in order from the object side to the image side. The seventh lens unit L7 includes, in order from the object side to the image side, a meniscus negative lens with its concave surface facing the image side and a plano-convex lens with its convex surface facing the image side.

According to the sixth exemplary embodiment, the first lens unit L1 includes, in order from the object side to the image side, a plano-convex lens with its convex surface facing the object side, a meniscus negative lens with its concave surface facing the image side, a biconcave lens, and a meniscus positive lens with its convex surface facing the object side. The second lens unit L2 includes a cemented lens including a biconvex lens and a meniscus negative lens with its concave surface facing the object side. The third lens unit L3 includes a meniscus negative lens with its concave surface facing the object side. The fourth lens unit L4 includes, in order from the object side to the image side, a biconvex lens and a cemented lens which includes a biconvex lens and a meniscus negative lens with its concave surface facing the object side. The fifth lens unit L5 includes a cemented lens including a biconcave lens and a meniscus positive lens with its concave surface facing the image side in order from the object side to the image side. The sixth lens unit L6 includes two biconvex lenses. The seventh lens unit L7 includes a meniscus negative lens with its concave surface facing the object side.

Next, lens data of numerical examples 1 to 6 corresponding to the first to sixth exemplary embodiments of the present invention will be described. The surface number indicates the order of the optical surface from the object side. The data includes a radius of curvature r of each optical surface, a distance d between optical surfaces, a refractive index nd at the d-line, an Abbe number vd, and an effective diameter of each optical material. The distance di is a distance between the i-th surface and the (i+1)th surface when i is the surface number. The description "(variable)" for the distance d between the optical surfaces represents changing of the distance during zooming.

Further, the focal length, the F-number, the angle of view (half angle of view of the entire zoom lens), the image height (the maximum image height for determining the half angle of view), the total lens length (the length from the first lens surface to the image plane along the optical axis), and the back focus (BF) (the length from the final lens surface to the image plane) are provided.

Further, the zoom lens unit data represents the focal length, the lens configuration length (the length of each lens unit along the optical axis), the front principal point position, and the rear principal point position of each lens unit.

The aspherical shape is represented as a shape satisfying the expression below, when the surface position in the optical axis direction at the position away from the surface vertex by the length R in the direction perpendicular to the optical axis is Sag(R):

$$Sag(R) = \frac{(1/R) \times R^2}{1 + \sqrt{1 - (1+K) \times (1/r)^2 \times R^2}} + A4 \times R^4 + A6 \times R^6 + A8 \times R^8 + A10 \times R^{10}$$

In the expression, K is eccentricity, r is a paraxial radius of curvature, and A4, A6, A8, and A10 are the aspheric coefficients. "e-x" means "$\times 10^{-x}$". Correspondence relations between the respective numerical examples and the above-described conditions are listed in Table 1.

Numerical Example 1

Unit: mm

Surface data

| Surface number | r | d | nd | vd | Effective diameter |
|---|---|---|---|---|---|
| 1 | 83.518 | 3.76 | 1.51633 | 64.1 | 42.02 |
| 2 | 1655.424 | 0.39 | | | 40.55 |
| 3 | 113.863 | 1.75 | 1.62299 | 58.2 | 36.21 |
| 4 | 18.722 | 6.52 | | | 27.65 |
| 5 | 1142.677 | 1.30 | 1.62299 | 58.2 | 27.19 |
| 6 | 15.703 | 0.50 | | | 23.61 |
| 7 | 16.312 | 4.35 | 1.84666 | 23.9 | 23.76 |
| 8 | 28.464 | (variable) | | | 22.72 |
| 9 | 225.079 | 1.81 | 1.48749 | 70.2 | 12.43 |
| 10 | −32.685 | (variable) | | | 12.56 |
| 11 | −72.013 | 0.79 | 1.83481 | 42.7 | 13.27 |
| 12 | 532.093 | (variable) | | | 13.47 |
| 13 | 25.686 | 4.89 | 1.74400 | 44.8 | 14.16 |
| 14 | −14.103 | 0.87 | 1.84666 | 23.9 | 14.05 |
| 15 | −47.551 | 1.00 | | | 14.09 |
| 16 (stop) | ∞ | (variable) | | | 13.74 |
| 17 | −31.278 | 2.03 | 1.84666 | 23.9 | 11.40 |
| 18 | −12.579 | 0.82 | 1.80100 | 35.0 | 11.61 |
| 19 | 138.052 | (variable) | | | 12.18 |
| 20 | −522.742 | 1.16 | 1.52996 | 55.8 | 16.39 |
| 21* | −81.470 | 0.21 | | | 16.79 |
| 22 | −121.153 | 2.87 | 1.48749 | 70.2 | 16.91 |
| 23 | −20.978 | (variable) | | | 17.49 |
| 24 | ∞ | BF | | | 20.11 |
| Image plane | ∞ | | | | |

Aspheric surface data
Twenty-first surface

K = 0.00000e+000   A4 = 2.91907e−005   A6 = 9.31471e−009
A8 = 1.99743e−010   A10 = −9.44250e−013

Unit: mm

Various data
Zoom ratio 2.90

| | Wide-angle | Middle | Telephoto |
|---|---|---|---|
| Focal length | 18.63 | 34.02 | 53.93 |
| F-number | 3.56 | 4.46 | 5.87 |
| Half angle of view | 36.26 | 21.88 | 14.21 |
| Image height | 13.66 | 13.66 | 13.66 |
| Total lens length | 123.91 | 117.56 | 127.08 |
| BF | 37.51 | 37.51 | 37.51 |
| d8 | 29.90 | 10.06 | 2.58 |
| d10 | 7.22 | 7.19 | 7.48 |
| d12 | 1.26 | 1.30 | 1.00 |
| d16 | 2.09 | 6.56 | 10.86 |
| d19 | 10.08 | 5.61 | 1.31 |
| d23 | 0.83 | 14.32 | 31.33 |
| Entrance pupil position | 26.29 | 23.50 | 21.90 |
| Exit pupil position | −28.35 | −39.23 | −52.36 |
| Front principal point position | 39.65 | 42.44 | 43.46 |
| Rear principal point position | 18.88 | 3.49 | −16.42 |

Zoom lens unit data

| Unit | Start surface | Focal length | Lens configuration length | Front principal point position | Rear principal point position |
|---|---|---|---|---|---|
| 1 | 1 | −25.16 | 18.56 | 9.27 | −4.23 |
| 2 | 9 | 58.68 | 1.81 | 1.07 | −0.15 |
| 3 | 11 | −75.93 | 0.79 | 0.05 | −0.38 |
| 4 | 13 | 26.01 | 6.75 | 0.99 | −3.38 |
| 5 | 17 | −34.05 | 2.85 | 0.17 | −1.38 |
| 6 | 20 | 40.59 | 4.25 | 2.78 | −0.13 |

Single lens data

| Lens | Start surface | Focal length |
|---|---|---|
| 1 | 1 | 170.21 |
| 2 | 3 | −36.22 |
| 3 | 5 | −25.57 |
| 4 | 7 | 38.76 |
| 5 | 9 | 58.68 |
| 6 | 11 | −75.93 |
| 7 | 13 | 12.91 |
| 8 | 14 | −23.96 |
| 9 | 17 | 23.67 |
| 10 | 18 | −14.36 |
| 11 | 20 | 181.94 |
| 12 | 22 | 51.56 |

Numerical Example 2

Unit: mm

Surface data

| Surface number | r | d | nd | vd | Effective diameter |
|---|---|---|---|---|---|
| 1 | 36.710 | 2.00 | 1.62299 | 58.2 | 37.44 |
| 2 | 22.404 | 4.22 | | | 31.97 |
| 3 | 48.990 | 1.75 | 1.62299 | 58.2 | 31.76 |
| 4 | 24.824 | 4.34 | | | 28.18 |

-continued

Unit: mm

| | | | | | |
|---|---|---|---|---|---|
| 5 | 182.976 | 1.30 | 1.62299 | 58.2 | 27.78 |
| 6 | 16.902 | 0.34 | | | 24.47 |
| 7 | 17.228 | 4.12 | 1.84666 | 23.9 | 24.56 |
| 8 | 28.125 | (variable) | | | 23.50 |
| 9 | 150.156 | 1.84 | 1.48749 | 70.2 | 12.54 |
| 10 | −36.084 | (variable) | | | 12.67 |
| 11 | −113.939 | 0.80 | 1.83481 | 42.7 | 13.25 |
| 12 | 152.981 | (variable) | | | 13.42 |
| 13 | 24.265 | 4.73 | 1.72916 | 54.7 | 14.08 |
| 14 | −13.753 | 0.85 | 1.80610 | 33.3 | 13.97 |
| 15 | −54.738 | 1.00 | | | 13.95 |
| 16 (stop) | ∞ | (variable) | | | 13.62 |
| 17 | −30.981 | 1.83 | 1.80100 | 35.0 | 11.68 |
| 18 | −15.560 | 0.85 | 1.70000 | 48.1 | 11.70 |
| 19 | 83.083 | (variable) | | | 12.06 |
| 20 | −221.315 | 1.00 | 1.52996 | 55.8 | 16.49 |
| 21* | −120.782 | 0.20 | | | 16.92 |
| 22 | 12162.632 | 3.11 | 1.48749 | 70.2 | 17.15 |
| 23 | −22.609 | (variable) | | | 17.72 |
| 24 | ∞ | BF | | | 20.02 |
| Image plane | ∞ | | | | |

Aspheric surface data
Twenty-first surface

K = 0.00000e+000  A4 = 2.80775e−005  A6 = −1.44904e−008
A8 = 1.06224e−009  A10 = −7.72128e−012

Various data
Zoom ratio 2.92

| | Wide-angle | Middle | Telephoto |
|---|---|---|---|
| Focal length | 18.50 | 36.00 | 54.00 |
| F-number | 3.56 | 4.50 | 5.87 |
| Half angle of view | 36.44 | 20.78 | 14.20 |
| Image height | 13.66 | 13.66 | 13.66 |
| Total lens length | 124.00 | 116.86 | 125.69 |
| BF | 37.50 | 37.50 | 37.50 |
| d8 | 31.42 | 8.89 | 2.61 |
| d10 | 7.54 | 6.83 | 7.54 |
| d12 | 1.00 | 1.71 | 1.00 |
| d16 | 1.76 | 6.67 | 10.62 |
| d19 | 10.43 | 5.51 | 1.56 |
| d23 | 0.05 | 15.44 | 30.55 |
| Entrance pupil position | 26.65 | 23.39 | 22.02 |
| Exit pupil position | −26.90 | −39.71 | −51.54 |
| Front principal point position | 39.84 | 42.61 | 43.27 |
| Rear principal point position | 19.00 | 1.50 | −16.50 |

Zoom lens unit data

| Unit | Start surface | Focal length | Lens configuration length | Front principal point position | Rear principal point position |
|---|---|---|---|---|---|
| 1 | 1 | −25.57 | 18.08 | 9.28 | −4.19 |
| 2 | 9 | 59.87 | 1.84 | 1.00 | −0.24 |
| 3 | 11 | −78.12 | 0.80 | 0.19 | −0.25 |
| 4 | 13 | 26.14 | 6.58 | 0.84 | −3.46 |
| 5 | 17 | −35.82 | 2.68 | 0.22 | −1.29 |
| 6 | 20 | 42.49 | 4.31 | 2.82 | −0.13 |

Single lens data

| Lens | Start surface | Focal length |
|---|---|---|
| 1 | 1 | −97.51 |
| 2 | 3 | −83.08 |
| 3 | 5 | −29.98 |

-continued

Unit: mm

| | | |
|---|---|---|
| 4 | 7 | 44.75 |
| 5 | 9 | 59.87 |
| 6 | 11 | −78.12 |
| 7 | 13 | 12.71 |
| 8 | 14 | −23.00 |
| 9 | 17 | 37.07 |
| 10 | 18 | −18.66 |
| 11 | 20 | 499.99 |
| 12 | 22 | 46.30 |

Numerical Example 3

Unit: mm
Surface data

| Surface number | r | d | nd | vd | Effective diameter |
|---|---|---|---|---|---|
| 1 | 76.201 | 4.00 | 1.51633 | 64.1 | 40.50 |
| 2 | ∞ | 0.20 | | | 39.00 |
| 3 | 87.093 | 1.60 | 1.62041 | 60.3 | 34.32 |
| 4 | 17.794 | 6.69 | | | 26.42 |
| 5 | −275.114 | 1.20 | 1.69680 | 55.5 | 25.93 |
| 6 | 17.652 | 0.85 | | | 23.11 |
| 7 | 18.819 | 3.98 | 1.84666 | 23.9 | 23.33 |
| 8 | 40.701 | (variable) | | | 22.55 |
| 9 | 514.990 | 1.75 | 1.48749 | 70.2 | 13.00 |
| 10 | −39.993 | (variable) | | | 13.00 |
| 11 | −23.240 | 0.80 | 1.62041 | 60.3 | 13.07 |
| 12 | −188.681 | (variable) | | | 13.63 |
| 13 | 38.777 | 3.25 | 1.69680 | 55.5 | 14.72 |
| 14 | −29.086 | 0.20 | | | 14.93 |
| 15 | 35.964 | 4.28 | 1.48749 | 70.2 | 14.67 |
| 16 | −18.478 | 1.00 | 1.84666 | 23.9 | 14.20 |
| 17 | −50.317 | 1.00 | | | 14.17 |
| 18 (stop) | ∞ | (variable) | | | 13.76 |
| 19 | −33.107 | 2.40 | 1.84666 | 23.9 | 10.97 |
| 20 | −11.931 | 1.20 | 1.80100 | 35.0 | 10.94 |
| 21 | 59.634 | (variable) | | | 11.45 |
| 22 | 180.914 | 1.70 | 1.52996 | 55.8 | 16.94 |
| 23* | −255.105 | 0.20 | | | 17.54 |
| 24 | ∞ | 3.54 | 1.48749 | 70.2 | 17.68 |
| 25 | −22.981 | (variable) | | | 18.39 |
| 26 | ∞ | BF | | | 19.99 |
| Image plane | ∞ | | | | |

Aspheric surface data
Twenty-third surface

K = 0.00000e+000  A4 = 2.36323e−005  A6 = 7.10067e−008
A8 = −1.09684e−009  A10 = 6.27088e−012

Various data
Zoom ratio 2.92

| | Wide-angle | Middle | Telephoto |
|---|---|---|---|
| Focal length | 18.50 | 34.52 | 54.00 |
| F-number | 3.54 | 4.50 | 5.87 |
| Half angle of view | 36.44 | 21.59 | 14.20 |
| Image height | 13.66 | 13.66 | 13.66 |
| Total lens length | 123.08 | 117.11 | 125.50 |
| BF | 35.50 | 35.50 | 35.50 |
| d8 | 29.35 | 9.51 | 2.00 |
| d10 | 3.87 | 4.73 | 4.96 |
| d12 | 2.29 | 1.43 | 1.20 |
| d18 | 3.42 | 7.23 | 10.77 |
| d21 | 8.75 | 4.94 | 1.41 |
| d25 | 0.05 | 13.92 | 29.82 |
| Entrance pupil position | 25.70 | 22.82 | 21.13 |

-continued

Unit: mm

| | | | |
|---|---|---|---|
| Exit pupil position | −30.12 | −40.45 | −52.24 |
| Front principal point position | 38.98 | 41.65 | 41.90 |
| Rear principal point position | 17.00 | 0.98 | −18.50 |

Zoom lens unit data

| Unit | Start surface | Focal length | Lens configuration length | Front principal point position | Rear principal point position |
|---|---|---|---|---|---|
| 1 | 1 | −25.60 | 18.52 | 8.63 | −5.23 |
| 2 | 9 | 76.20 | 1.75 | 1.09 | −0.08 |
| 3 | 11 | −42.80 | 0.80 | −0.07 | −0.56 |
| 4 | 13 | 19.37 | 9.73 | 1.38 | −5.25 |
| 5 | 19 | −28.02 | 3.60 | 0.60 | −1.33 |
| 6 | 22 | 38.65 | 5.44 | 3.11 | −0.62 |

Single lens data

| Lens | Start surface | Focal length |
|---|---|---|
| 1 | 1 | 147.58 |
| 2 | 3 | −36.37 |
| 3 | 5 | −23.77 |
| 4 | 7 | 38.16 |
| 5 | 9 | 76.20 |
| 6 | 11 | −42.80 |
| 7 | 13 | 24.33 |
| 8 | 15 | 25.70 |
| 9 | 16 | −34.99 |
| 10 | 19 | 20.94 |
| 11 | 20 | −12.32 |
| 12 | 22 | 200.00 |
| 13 | 24 | 47.14 |

Numerical Example 4

Unit: mm

Surface data

| Surface number | r | d | nd | vd | Effective diameter |
|---|---|---|---|---|---|
| 1 | 70.840 | 4.00 | 1.51633 | 64.1 | 42.00 |
| 2 | ∞ | 0.20 | | | 41.00 |
| 3 | 93.231 | 1.60 | 1.62041 | 60.3 | 35.98 |
| 4 | 18.408 | 7.26 | | | 27.52 |
| 5 | −162.697 | 1.20 | 1.69680 | 55.5 | 27.00 |
| 6 | 18.567 | 0.96 | | | 24.13 |
| 7 | 20.143 | 4.04 | 1.84666 | 23.9 | 24.37 |
| 8 | 45.497 | (variable) | | | 23.66 |
| 9 | 532.188 | 1.75 | 1.48749 | 70.2 | 13.00 |
| 10 | −40.137 | (variable) | | | 13.00 |
| 11 | −26.949 | 0.65 | 1.83400 | 37.2 | 13.62 |
| 12 | 77.236 | 1.84 | 1.84666 | 23.9 | 14.20 |
| 13 | −86.242 | (variable) | | | 14.58 |
| 14 | 38.407 | 3.53 | 1.69680 | 55.5 | 15.68 |
| 15 | −29.312 | 0.20 | | | 15.80 |
| 16 | 39.552 | 4.27 | 1.48749 | 70.2 | 15.24 |
| 17 | −19.247 | 1.00 | 1.84666 | 23.9 | 14.62 |
| 18 | −76.735 | 2.10 | | | 14.51 |
| 19 (stop) | ∞ | (variable) | | | 13.88 |
| 20 | −29.086 | 2.57 | 1.84666 | 23.9 | 11.11 |
| 21 | −11.320 | 1.20 | 1.80100 | 35.0 | 11.25 |
| 22 | 106.692 | (variable) | | | 11.93 |
| 23 | 714.406 | 1.70 | 1.52996 | 55.8 | 17.50 |
| 24* | −240.625 | 0.20 | | | 18.17 |
| 25 | ∞ | 3.75 | 1.48749 | 70.2 | 18.31 |
| 26 | −22.369 | (variable) | | | 19.03 |
| 27 | ∞ | BF | | | 20.35 |
| Image plane | ∞ | | | | |

Aspheric surface data
Twenty-fourth surface

K = 0.00000e+000  A4 = 2.31905e−005  A6 = 6.17475e−008
A8 = −8.84794e−010  A10 = 4.54132e−012

Various data
Zoom ratio 2.92

| | Wide-angle | Middle | Telephoto |
|---|---|---|---|
| Focal length | 18.50 | 36.00 | 54.00 |
| F-number | 3.53 | 4.50 | 5.87 |
| Half angle of view | 36.44 | 20.78 | 14.20 |
| Image height | 13.66 | 13.66 | 13.66 |
| Total lens length | 131.53 | 124.02 | 132.30 |
| BF | 35.50 | 35.50 | 35.50 |
| d8 | 31.73 | 9.19 | 2.00 |
| d10 | 4.36 | 5.46 | 5.67 |
| d13 | 2.52 | 1.41 | 1.20 |
| d19 | 3.54 | 8.54 | 12.04 |
| d22 | 9.81 | 4.81 | 1.31 |
| d26 | 0.05 | 15.08 | 30.55 |
| Entrance pupil position | 26.93 | 24.10 | 22.70 |
| Exit pupil position | −34.13 | −44.30 | −55.47 |
| Front principal point position | 40.52 | 43.86 | 44.65 |
| Rear principal point position | 17.00 | −0.50 | −18.50 |

Zoom lens unit data

| Unit | Start surface | Focal length | Lens configuration length | Front principal point position | Rear principal point position |
|---|---|---|---|---|---|
| 1 | 1 | −26.04 | 19.27 | 8.97 | −5.62 |
| 2 | 9 | 76.64 | 1.75 | 1.10 | −0.08 |
| 3 | 11 | −48.65 | 2.49 | −0.65 | −2.03 |
| 4 | 14 | 21.54 | 11.10 | 0.99 | −6.80 |
| 5 | 20 | −30.44 | 3.77 | 0.30 | −1.74 |
| 6 | 23 | 40.75 | 5.65 | 3.50 | −0.36 |

Single lens data

| Lens | Start surface | Focal length |
|---|---|---|
| 1 | 1 | 137.20 |
| 2 | 3 | −37.28 |
| 3 | 5 | −23.85 |
| 4 | 7 | 39.78 |
| 5 | 9 | 76.64 |
| 6 | 11 | −23.89 |
| 7 | 12 | 48.38 |
| 8 | 14 | 24.38 |
| 9 | 16 | 27.21 |
| 10 | 17 | −30.59 |
| 11 | 20 | 20.53 |
| 12 | 21 | −12.72 |
| 13 | 23 | 339.85 |
| 14 | 25 | 45.89 |

Numerical Example 5

Unit: mm

Surface data

| Surface number | r | d | nd | vd | Effective diameter |
|---|---|---|---|---|---|
| 1 | 81.435 | 4.00 | 1.51633 | 64.1 | 41.99 |
| 2 | ∞ | 0.20 | | | 40.52 |
| 3 | 71.919 | 1.60 | 1.62041 | 60.3 | 34.88 |
| 4 | 17.644 | 7.33 | | | 26.85 |
| 5 | −143.178 | 1.20 | 1.69680 | 55.5 | 26.33 |
| 6 | 19.270 | 1.13 | | | 23.69 |
| 7 | 21.264 | 3.83 | 1.84666 | 23.9 | 23.91 |
| 8 | 48.794 | (variable) | | | 23.22 |
| 9 | −689.063 | 1.75 | 1.48749 | 70.2 | 13.00 |
| 10 | −36.266 | (variable) | | | 13.00 |
| 11 | −28.066 | 0.69 | 1.83400 | 37.2 | 13.50 |
| 12 | 52.493 | 1.98 | 1.84666 | 23.9 | 14.18 |
| 13 | −110.834 | (variable) | | | 14.60 |
| 14 | 37.639 | 3.59 | 1.69680 | 55.5 | 15.77 |
| 15 | −28.707 | (variable) | | | 15.94 |
| 16 | 35.581 | 4.52 | 1.48749 | 70.2 | 15.23 |
| 17 | −18.320 | 1.00 | 1.84666 | 23.9 | 14.60 |
| 18 | −88.297 | 1.00 | | | 14.48 |
| 19 (stop) | ∞ | (variable) | | | 14.16 |
| 20 | −37.873 | 2.73 | 1.84666 | 23.9 | 11.64 |
| 21 | −12.040 | 1.20 | 1.80100 | 35.0 | 11.53 |
| 22 | 96.455 | (variable) | | | 12.04 |
| 23 | 243.913 | 1.70 | 1.52996 | 55.8 | 17.20 |
| 24* | 197.384 | 0.56 | | | 17.84 |
| 25 | ∞ | 3.65 | 1.48749 | 70.2 | 17.98 |
| 26 | −23.117 | (variable) | | | 18.71 |
| 27 | ∞ | BF | | | 20.36 |
| Image plane | ∞ | | | | |

Aspheric surface data
Twenty-fourth surface

K = 0.00000e+000  A4 = 2.30763e−005  A6 = 5.59354e−008
A8 = −9.41156e−010  A10 = 5.14205e−012

Various data
Zoom ratio 2.92

| | Wide-angle | Middle | Telephoto |
|---|---|---|---|
| Focal length | 18.50 | 35.00 | 53.98 |
| F-number | 3.58 | 4.49 | 5.87 |
| Half angle of view | 36.44 | 21.32 | 14.20 |
| Image height | 13.66 | 13.66 | 13.66 |
| Total lens length | 133.99 | 125.41 | 134.99 |
| BF | 35.49 | 35.49 | 35.49 |
| d8 | 31.51 | 8.67 | 2.00 |
| d10 | 5.00 | 4.98 | 5.37 |
| d13 | 2.63 | 2.26 | 1.20 |
| d15 | 0.20 | 0.59 | 1.26 |
| d19 | 3.37 | 8.17 | 12.52 |
| d22 | 10.39 | 5.58 | 1.23 |
| d26 | 0.05 | 14.30 | 30.55 |
| Entrance pupil position | 28.11 | 25.16 | 24.00 |
| Exit pupil position | −32.97 | −43.79 | −55.79 |
| Front principal point position | 41.61 | 44.71 | 46.06 |
| Rear principal point position | 16.99 | 0.49 | −18.49 |

Zoom lens unit data

| Unit | Start surface | Focal length | Lens configuration length | Front principal point position | Rear principal point position |
|---|---|---|---|---|---|
| 1 | 1 | −25.65 | 19.29 | 10.38 | −6.05 |
| 2 | 9 | 78.46 | 1.75 | 1.24 | 0.07 |
| 3 | 11 | −46.50 | 2.67 | −0.52 | −1.99 |
| 4 | 14 | 23.90 | 3.59 | 1.23 | −0.94 |
| 5 | 16 | 242.23 | 6.52 | −6.04 | −10.42 |
| 6 | 20 | −36.88 | 3.93 | 0.45 | −1.67 |
| 7 | 23 | 48.63 | 5.91 | 4.10 | −0.04 |

Single lens data

| Lens | Start surface | Focal length |
|---|---|---|
| 1 | 1 | 157.72 |
| 2 | 3 | −38.11 |
| 3 | 5 | −24.30 |
| 4 | 7 | 41.85 |
| 5 | 9 | 78.46 |
| 6 | 11 | −21.84 |
| 7 | 12 | 42.31 |
| 8 | 14 | 23.90 |
| 9 | 16 | 25.51 |
| 10 | 17 | −27.48 |
| 11 | 20 | 19.89 |
| 12 | 21 | −13.30 |
| 13 | 23 | −1977.47 |
| 14 | 25 | 47.42 |

Numerical Example 6

Unit: mm

Surface data

| Surface number | r | d | nd | vd | Effective diameter |
|---|---|---|---|---|---|
| 1 | 85.023 | 4.00 | 1.51633 | 64.1 | 43.00 |
| 2 | ∞ | 0.20 | | | 41.54 |
| 3 | 73.084 | 1.60 | 1.62041 | 60.3 | 35.72 |
| 4 | 17.600 | 7.80 | | | 27.32 |
| 5 | −116.895 | 1.20 | 1.69680 | 55.5 | 26.81 |
| 6 | 18.780 | 0.47 | | | 24.19 |
| 7 | 19.698 | 4.48 | 1.84666 | 23.9 | 24.31 |
| 8 | 52.147 | (variable) | | | 23.57 |
| 9 | 412.563 | 1.90 | 1.60311 | 60.6 | 13.00 |
| 10 | −32.853 | 0.60 | 1.69895 | 30.1 | 13.00 |
| 11 | −48.354 | (variable) | | | 13.00 |
| 12 | −30.623 | 0.70 | 1.62041 | 60.3 | 13.56 |
| 13 | −483.146 | (variable) | | | 13.92 |
| 14 | 35.026 | 3.20 | 1.75700 | 47.8 | 14.87 |
| 15 | −32.812 | 0.81 | | | 14.97 |
| 16 | 40.649 | 3.76 | 1.48749 | 70.2 | 14.41 |
| 17 | −20.343 | 0.70 | 1.84666 | 23.8 | 13.87 |
| 18 | −201.076 | 1.00 | | | 13.73 |
| 19 (stop) | ∞ | (variable) | | | 13.50 |
| 20 | −34.419 | 0.70 | 1.80440 | 39.6 | 11.20 |
| 21 | 18.894 | 2.19 | 1.84666 | 23.8 | 11.74 |
| 22 | 77.354 | (variable) | | | 12.10 |
| 23 | 302.697 | 1.70 | 1.52996 | 55.8 | 18.15 |
| 24* | −162.787 | 0.20 | | | 18.79 |
| 25 | 187.560 | 4.54 | 1.51633 | 64.1 | 19.17 |
| 26 | −21.357 | (variable) | | | 19.93 |
| 27 | −25.370 | 1.00 | 1.54072 | 47.2 | 20.03 |
| 28 | −30.489 | (variable) | | | 20.50 |
| 29 | ∞ | BF | | | 20.84 |
| Image plane | ∞ | | | | |

Aspheric surface data
Twenty-fourth surface

K = 0.00000e+000  A4 = 2.22087e−005  A6 = 6.78887e−008
A8 = −7.97861e−010  A10 = 3.73134e−012

-continued

Unit: mm

Various data
Zoom ratio 2.92

|  | Wide-angle | Middle | Telephoto |
|---|---|---|---|
| Focal length | 18.50 | 35.00 | 54.00 |
| F-number | 3.45 | 4.50 | 5.87 |
| Half angle of view | 36.44 | 21.32 | 14.20 |
| Image height | 13.66 | 13.66 | 13.66 |
| Total lens length | 131.53 | 125.83 | 134.00 |
| BF | 35.50 | 35.50 | 35.50 |
| d8 | 30.03 | 9.66 | 2.00 |
| d11 | 4.68 | 6.04 | 5.99 |
| d13 | 2.51 | 1.16 | 1.20 |
| d19 | 3.37 | 8.50 | 12.42 |
| d22 | 10.45 | 5.32 | 1.40 |
| d26 | 0.50 | 1.32 | 5.69 |
| d28 | 0.05 | 13.90 | 25.36 |
| Entrance pupil position | 28.45 | 25.71 | 24.10 |
| Exit pupil position | −40.83 | −48.97 | −58.17 |
| Front principal point position | 42.46 | 46.21 | 46.97 |
| Rear principal point position | 17.00 | 0.50 | −18.50 |

Zoom lens unit data

| Unit | Start surface | Focal length | Lens configuration length | Front principal point position | Rear principal point position |
|---|---|---|---|---|---|
| 1 | 1 | −26.25 | 19.75 | 10.71 | −5.71 |
| 2 | 9 | 77.00 | 2.50 | 1.45 | −0.09 |
| 3 | 12 | −52.73 | 0.70 | −0.03 | −0.46 |
| 4 | 14 | 22.61 | 9.46 | 0.19 | −6.17 |
| 5 | 20 | −30.83 | 2.89 | 0.50 | −1.05 |
| 6 | 23 | 31.96 | 6.44 | 3.54 | −0.84 |
| 7 | 27 | −300.00 | 1.00 | −3.45 | −4.15 |

Single lens data

| Lens | Start surface | Focal length |
|---|---|---|
| 1 | 1 | 164.67 |
| 2 | 3 | −37.78 |
| 3 | 5 | −23.14 |
| 4 | 7 | 35.17 |
| 5 | 9 | 50.54 |
| 6 | 10 | −148.99 |
| 7 | 12 | −52.73 |
| 8 | 14 | 22.84 |
| 9 | 16 | 28.39 |
| 10 | 17 | −26.78 |
| 11 | 20 | −15.08 |
| 12 | 21 | 29.03 |
| 13 | 23 | 200.00 |
| 14 | 25 | 37.41 |
| 15 | 27 | −300.00 |

TABLE 1

Numerical Examples

| Condition | 1 | 2 | 3 | 4 | 5 | 6 |
|---|---|---|---|---|---|---|
| (1) | 3.2 | 3.2 | 4.1 | 4.1 | 4.2 | 4.2 |
| (2) | 4.1 | 4.2 | 2.3 | 2.6 | 2.5 | 2.9 |
| (3) | 0.10 | 0.10 | 0.09 | 0.09 | 0.09 | 0.14 |
| (4) | 0.04 | 0.04 | 0.04 | 0.13 | 0.14 | 0.04 |
| (5) | −1.3 | −1.6 | −1.2 | −1.2 | −0.9 | −1.3 |
| (6) | −0.017 | −0.016 | −0.021 | −0.014 | −0.013 | −0.017 |
| (7) | 0.32 | 0.30 | 1.39 | 1.12 | 1.29 | 0.95 |
| (8) | 1.20 | 1.21 | 0.89 | 0.88 | 0.86 | 0.91 |

Next, an exemplary embodiment of a digital camera (image pickup apparatus) using the zoom lens according to the exemplary embodiments of the present invention as a photographic optical system will be described. In FIG. 13, a single-lens reflex camera body 10 and an interchangeable lens 11 mounted with the zoom lens according to the exemplary embodiments of the present invention are illustrated. A photosensitive surface 12 is a photosensitive surface of a silver-halide film for recording an object image acquired through the interchangeable lens 11 or a photosensitive surface made of a solid-state image sensor (photoelectric conversion element) or the like for receiving an object image. FIG. 13 illustrates a viewfinder optical system 13 for observing the object image sent from the interchangeable lens 11, and a pivotal quick return mirror 14 for switching the destination of the object image sent from the interchangeable lens 11 between the photosensitive surface 12 and the viewfinder optical system 13 for transmission.

To observe the object image through the viewfinder, the object image formed on a focusing screen 15 through the quick return mirror 14 is converted into an erect image by a pentagonal prism 16, and then, the erect image is enlarged in an eyepiece optical system 17 for observation. During image recording, the quick return mirror 14 pivots in the direction indicated by the arrow and the object image is formed on the photosensitive surface 12 to be recorded.

By applying the zoom lens according to the exemplary embodiments of the present invention to an image pickup apparatus such as a single-lens reflex camera as described above, an optical apparatus with high optical performance can be realized. Incidentally, the present invention can be also applied to a single-lens reflex (SLR) camera without a quick return mirror. The zoom lens according to the exemplary embodiments of the present invention can be also applied to a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-174066 filed Aug. 6, 2012, which is hereby incorporated by reference herein in its entirety.

What is claimed is:

1. A zoom lens comprising, in order from an object side to an image side:
   a first lens unit having negative refractive power;
   a second lens unit having positive refractive power;
   a third lens unit having negative refractive power; and
   a rear lens group including a plurality of lens units and having overall positive refractive power,
   wherein a distance between every adjacent lens unit among all the lens units included in the zoom lens being variable during zooming,
   wherein the first lens unit moves along a locus convex toward the image side during zooming from a wide-angle end to a telephoto end,
   wherein the second lens unit moves along a direction non-parallel to an optical axis during image shake correction, the third lens unit moves along an optical axis direction during focusing, each of the second lens unit and the third lens unit consists of a single lens element, and
   wherein, when a focal length of the zoom lens at the wide-angle end is denoted by fw, a focal length of the second lens unit is denoted by f2, and a focal length of the third lens unit is denoted by f3, the following conditions are satisfied:

$$2.8 < f2/fw < 4.4$$

$$1.8 < |f3|/fw < 4.5.$$

2. The zoom lens according to claim 1, wherein, when a thickness of the second lens unit along the optical axis is denoted by d2, the following condition is satisfied:

$$0.05 < d2/fw < 0.20.$$

3. The zoom lens according to claim 1, wherein, when a thickness of the third lens unit along the optical axis is denoted by d3, the following condition is satisfied:

$$0.02 < d3/fw < 0.20.$$

4. The zoom lens according to claim 1, wherein, when a radius of curvature of a lens surface nearest to the object side in the second lens unit is denoted by R2o and a radius of curvature of a lens surface nearest to the image side in the second lens unit is denoted by R2i, the following condition is satisfied:

$$-2.3 < (R2i-R2o)/(R2i+R2o) < -0.5.$$

5. The zoom lens according to claim 1, wherein, when a focal length of the zoom lens at a telephoto end is denoted by ft, and a focal length and an Abbe number of an i-th lens of the third lens unit from the object side are denoted by f3i and vd3i, respectively, the following condition is satisfied:

$$-0.025 < \Sigma((ft/f3i)/vd3i) < -0.010.$$

6. The zoom lens according to claim 1, wherein, when a lateral magnification of the third lens unit at the wide-angle end is denoted by β3w and a lateral magnification of the rear lens group at the wide-angle end is denoted by βrw, the following condition is satisfied:

$$0.17 < (1-\beta 3w^2) \times \beta rw^2 < 1.80.$$

7. The zoom lens according to claim 1, wherein, when lateral magnifications of the rear lens group at the wide-angle end and the telephoto end are denoted by βrw and βrt, respectively, and a focal length of the zoom lens at the telephoto end is denoted by ft, the following condition is satisfied:

$$0.70 < (\beta rt \times fw)/(\beta rw \times ft) < 1.40.$$

8. The zoom lens according to claim 1, wherein the second lens unit and the third lens unit move toward the object side during zooming from the wide-angle end to a telephoto end.

9. The zoom lens according to claim 1, wherein the rear lens group includes, in order from the object side to the image side, a fourth lens unit having positive refractive power, a fifth lens unit having negative refractive power, and a sixth lens unit having positive refractive power.

10. The zoom lens according to claim 1, wherein the rear lens group includes, in order from the object side to the image side, a fourth lens unit having positive refractive power, a fifth lens unit having positive refractive power, a sixth lens unit having negative refractive power, and a seventh lens unit having positive refractive power.

11. The zoom lens according to claim 1, wherein the rear lens group includes, in order from the object side to the image side, a fourth lens unit having positive refractive power, a fifth lens unit having negative refractive power, a sixth lens unit having positive refractive power, and a seventh lens unit having negative refractive power.

12. The zoom lens according to claim 1, wherein all of the lens units included in the rear lens group move toward the object side during zooming from the wide-angle end to the telephoto end.

13. The zoom lens according to claim 1, wherein the zoom lens forms an image on a solid-state image sensor.

14. An image pickup apparatus comprising:
a zoom lens; and
a solid-state image sensor configured to receive an image formed by the zoom lens,
wherein the zoom lens comprises, in order from an object side to an image side, a first lens unit having negative refractive power, a second lens unit having positive refractive power, a third lens unit having negative refractive power, and a rear lens group including a plurality of lens units and having overall positive refractive power, a distance between every adjacent lens units being variable during zooming,
wherein the first lens unit moves along a locus convex toward the image side during zooming from a wide-angle end to a telephoto end,
wherein the second lens unit moves along a direction non-parallel to an optical axis during image shake correction, the third lens unit moves along an optical axis direction during focusing, each of the second lens unit and the third lens unit consists of a single lens element, and
wherein, when a focal length of the zoom lens at the wide-angle end is denoted by fw, a focal length of the second lens unit is denoted by f2, and a focal length of the third lens unit is denoted by f3, the following conditions are satisfied:

$$2.8 < f2/fw < 4.4$$

$$1.8 < |f3|/fw < 4.5.$$

15. A zoom lens comprising, in order from an object side to an image side:
a first lens unit having negative refractive power;
a second lens unit having positive refractive power;
a third lens unit having negative refractive power; and
a rear lens group including a plurality of lens units and having overall positive refractive power,
wherein a distance between every adjacent lens unit among all the lens units included in the zoom lens being variable during zooming,
wherein the second lens unit moves along a direction non-parallel to an optical axis during image shake correction, the third lens unit moves along an optical axis direction during focusing, each of the second lens unit and the third lens unit consists of a single lens element,
wherein the second lens unit and the third lens unit move toward the object side during zooming from a wide-angle end to a telephoto end, and
wherein, when a focal length of the zoom lens at the wide-angle end is denoted by fw, a focal length of the second lens unit is denoted by f2, and a focal length of the third lens unit is denoted by f3, the following conditions are satisfied:

$$2.8 < f2/fw < 4.4$$

$$1.8 < |f3|/fw < 4.5.$$

* * * * *